US006735570B1

(12) United States Patent
Lacy et al.

(10) Patent No.: US 6,735,570 B1
(45) Date of Patent: May 11, 2004

(54) SYSTEM AND METHOD FOR EVALUATING A SELECTABLE GROUP OF PEOPLE AGAINST A SELECTABLE SET OF SKILLS

(75) Inventors: David R. Lacy, Cottage Grove, MN (US); Ted G. Lautzenheiser, Forest Lake, MN (US); Mary A. Bucher, Corcoran, MN (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/366,018

(22) Filed: Aug. 2, 1999

(51) Int. Cl.[7] .............................................. G06F 17/60
(52) U.S. Cl. ....................... 705/7; 705/8; 705/9; 705/11
(58) Field of Search ............................. 705/11, 7, 8–9; 434/118, 219, 350; G06F 17/60

(56) References Cited

U.S. PATENT DOCUMENTS

| | | | | |
|---|---|---|---|---|
| 5,692,906 A | * | 12/1997 | Corder | |
| 5,724,262 A | * | 3/1998 | Ghahramani | 705/7 |
| 5,879,165 A | * | 3/1999 | Brunkow et al. | 434/322 |
| 5,918,207 A | * | 6/1999 | McGovern et al. | 705/8 |
| 6,126,448 A | * | 10/2000 | Ho et al. | 434/118 |
| 6,144,838 A | * | 11/2000 | Sheehan | |
| 6,157,808 A | * | 12/2000 | Hollingsworth | 434/219 |
| 6,275,812 B1 | * | 8/2001 | Haq et al. | 705/11 |
| 6,289,340 B1 | * | 9/2001 | Puram et al. | 705/7 |
| 6,295,509 B1 | * | 9/2001 | Driskell | 702/182 |
| 6,524,109 B1 | * | 2/2003 | Lacy et al. | 705/9 |
| 6,526,387 B1 | * | 2/2003 | Ruffin et al. | 705/7 |

FOREIGN PATENT DOCUMENTS

| | | | | |
|---|---|---|---|---|
| SU | 653621 A | * | 3/1979 | G09B/9/00 |
| SU | 750549 B | * | 7/1980 | G09B/19/26 |
| SU | 760168 B | * | 9/1980 | G09B/19/26 |
| SU | 1451758 A | * | 1/1989 | G09B/9/00 |
| WO | WO0000987 | * | 1/2000 | G06F/17/60 |
| WO | 3009187 A1 | * | 1/2003 | G06F/17/60 |

OTHER PUBLICATIONS

See the attached continuation sheet.*

Havens, Derwent–Acc–No: 1999–383936—Jun. 1, 1999, Skilled worker productivity assessment system for business operation.*

Holtzman, Genetic testing and public policy, British Medical Journal, Mar. 14, 1998, 12 pages.*

From http://www.findarticles.com, Ohio Senate and House declare "Ohio classroom technology week", PR Newswire, Oct. 7, 1998, 2 pages.*

Bashook, Recertification and the maintenance of competence, British Medical Journal, Feb. 14, 1998, 10 pages.*

McCray, Not all students learn to read by third grade: middle school students speak out about their reading disabilities, Journal of special education, Spring 2001, 34 pages.*

LoBuono, Taking advantage of home testing and monitoring, Patient Care, Feb. 15, 2000, 14 pages.*

(List continued on next page.)

*Primary Examiner*—Cuong Nguyen
(74) *Attorney, Agent, or Firm*—Beth L. McMahon; Charles A. Johnson; Mark T. Starr

(57) ABSTRACT

An improved administration system for use in managing and reporting skill assessment data entered by users of a skill assessment tool is disclosed. The skill assessment tool of the preferred embodiment may include a large skill set of possibly-unrelated skills. A large, diverse use population may employ the skill assessment tool to enter data rating a user's proficiency at performing ones of the skills in the skill set. The resulting skill assessment data may therefore be both extensive and diverse. The administration system allows the skill assessment data to be reported using any selectable subset of the users or any selectable subset of the skills supported by the skill assessment tool.

26 Claims, 18 Drawing Sheets

OTHER PUBLICATIONS

LaFee, Linking teacher to student scores, School Administrator, Oct. 2000, 14 pages.*

From http://www.findarticles.com, Test center comparison, (4 Web–to–host products reviewed—software review/evaluation), InfoWorld, Mar. 13, 2000, 22 pages.*

Evenbeck, Enhancing learning assessment and accountability, Change, May 2001, 19 pages.*

Haapaniemi, A new kind of lesson plan (Web–based employee training—statistical data included), Chief Executive, Feb. 2001, 5 pages.*

Clyde, CPE is broke; let's fix it (CPA continuing education), Journal of Accountancy, Dec. 1998, 14 pages.*

Ediger, Reading and vocabulary development, Journal of Instructional Psychology, Mar. 1999, 13 pages.*

Pfenninger et al. (Pub. U.S. 2001/0031457 A1—Oct. 2001), Test administration system using the Internet.*

* cited by examiner

Skill Set Management

Create a new Named Skill Set by supplying a Name, Author, the Skills to be included, and pressing "Create Skill Set":

Note: You can select multiple skills in the skill selection box by holding down the CTRL key while you choose skills.

Skill Set Name: [_____] 400

Skill Set Author: [_____] 402

Parent Skill Set: [_____] 420 ▽ 422

MSSD: ◉ — 418

Reporting: ○ — 404

406
```
1002 : Administration
1003 : Business Orientation
1004 : Business Strategy Awareness
1005 : Business/Tactical Planning
1006 : Financial/Budget Management
1007 : Program Management
1008 : Project Management
1012 : Follow-up
1014 : Organizational Awareness
1501 : Client Dedicated
```
410

| Create Skill Set 408 | Add to Skill Set 412 | Delete from Skill Set 414 |

Delete a Named Skill Set by selecting the appropriate name, and pressing "Delete Skill Set":

```
1100/2200 Series
A Series
Analysis
Behavior
Business
Communication and Networks
Competitors
Database Concepts
Database Management Systems
Development Languages and Tools
```

Delete Skill Set 416

Show the skills in a Named Skill Set by selecting the appropriate name, and pressing "Show Skill Set":

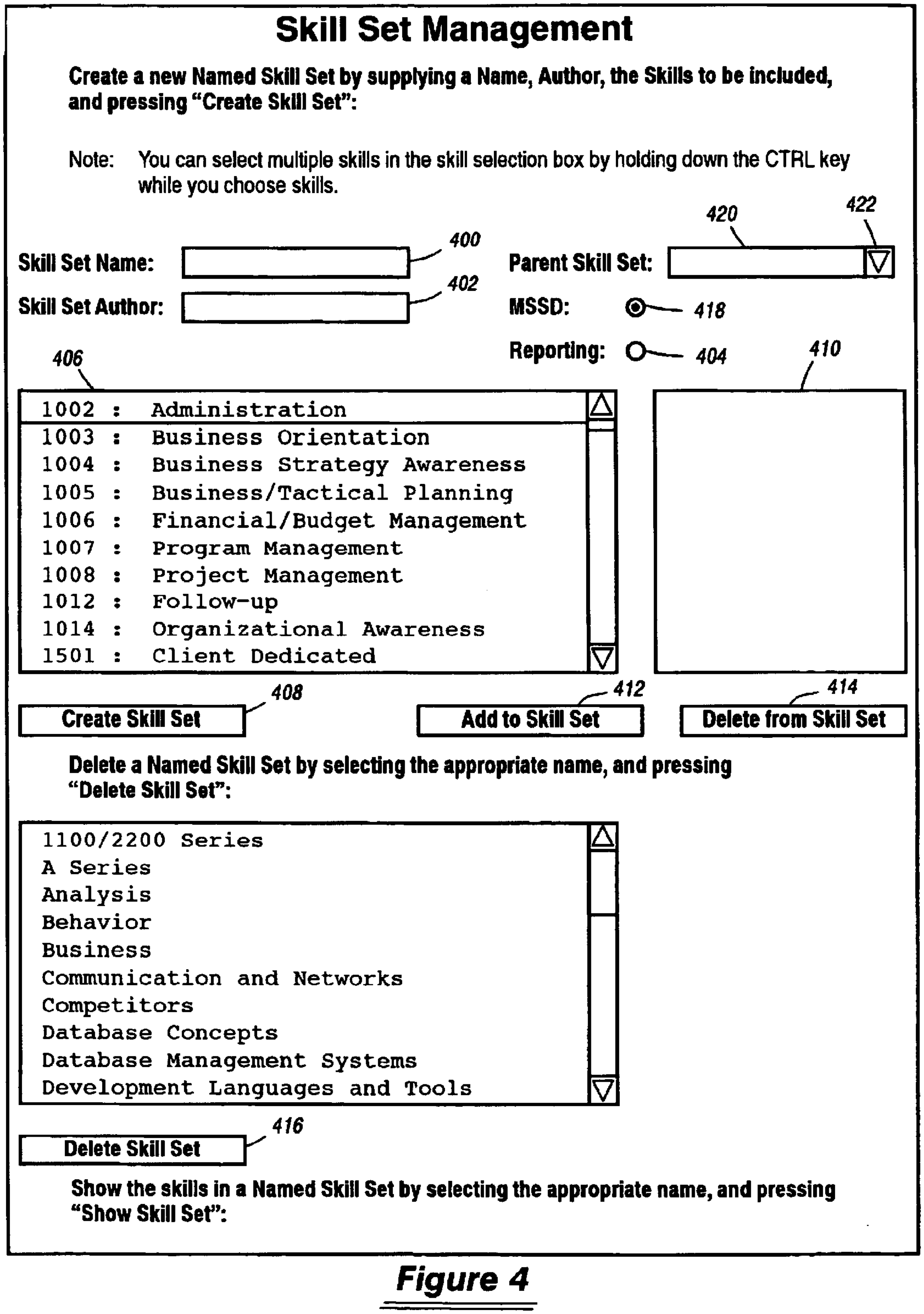

Figure 4

Skills to be Assessed for Category: Engineering and Design Tools

Group: Required Categories Skill Set: Group 1 Number of Skills: 7

Enter/update your Proficiency Level for the skills below, check the "Mark this category as Complete" box, then click on "Save" to update the database. Click here for a detailed description of the assessment scale.

| Skill Name & Description | Proficiency |
|---|---|
| Skill: Synthesis Tools | ○ Blank/None ○ Basic ◉ Intermediate ○ Advanced ○ Expert |
| Skill: Timing Analysis & Verification | ○ Blank/None ○ Basic ○ Intermediate ◉ Advanced ○ Expert |
| Skill: Floor Planning Tools | ○ Blank/None ◉ Basic ○ Intermediate ○ Advanced ○ Expert |
| Skill: Place and Route | ○ Blank/None ○ Basic ◉ Intermediate ○ Advanced ○ Expert |
| Skill: Behavioral Stimulation Tools | ○ Blank/None ◉ Basic ○ Intermediate ○ Advanced ○ Expert |
| Skill: Cycle Based Stimulation Tools | ○ Blank/None ○ Basic ◉ Intermediate ○ Advanced ○ Expert |
| Skill: HW Description Languages (HDL) | ○ Blank/None ○ Basic ○ Intermediate ◉ Advanced ○ Expert |

[Save] 504

Mark this category as Complete: ☑ 502

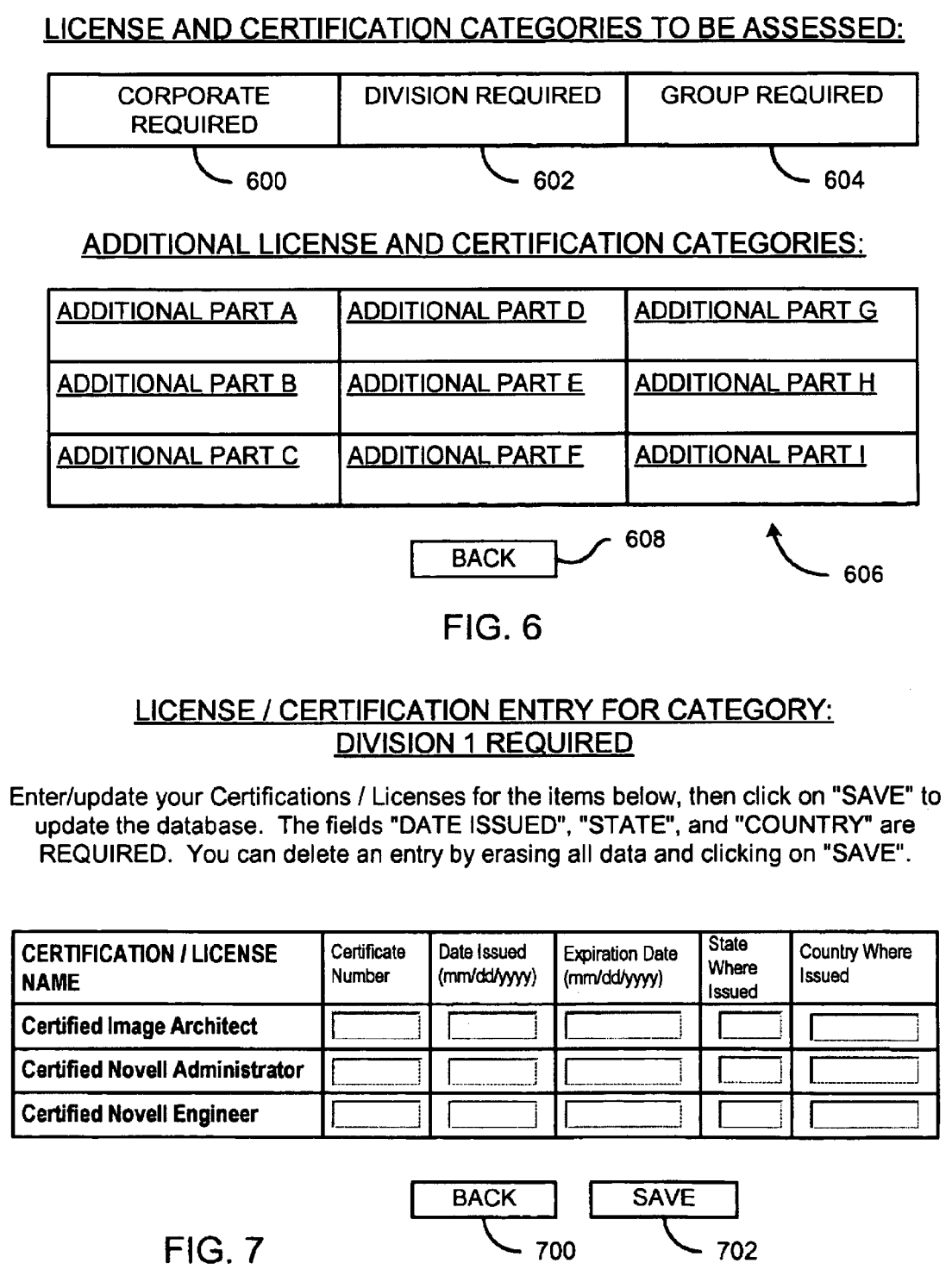

LICENSE AND CERTIFICATION CATEGORIES TO BE ASSESSED:

| | | |
|---|---|---|
| CORPORATE REQUIRED | DIVISION REQUIRED | GROUP REQUIRED |
| 600 | 602 | 604 |

ADDITIONAL LICENSE AND CERTIFICATION CATEGORIES:

| | | |
|---|---|---|
| ADDITIONAL PART A | ADDITIONAL PART D | ADDITIONAL PART G |
| ADDITIONAL PART B | ADDITIONAL PART E | ADDITIONAL PART H |
| ADDITIONAL PART C | ADDITIONAL PART F | ADDITIONAL PART I |

606

BACK 608

FIG. 6

LICENSE / CERTIFICATION ENTRY FOR CATEGORY:
DIVISION 1 REQUIRED

Enter/update your Certifications / Licenses for the items below, then click on "SAVE" to update the database. The fields "DATE ISSUED", "STATE", and "COUNTRY" are REQUIRED. You can delete an entry by erasing all data and clicking on "SAVE".

| CERTIFICATION / LICENSE NAME | Certificate Number | Date Issued (mm/dd/yyyy) | Expiration Date (mm/dd/yyyy) | State Where Issued | Country Where Issued |
|---|---|---|---|---|---|
| **Certified Image Architect** | | | | | |
| **Certified Novell Administrator** | | | | | |
| **Certified Novell Engineer** | | | | | |

BACK 700 SAVE 702

FIG. 7

Skills Administrative Functions

○ 1. Generate Skills Assessment Metrics —— 800

802
\
⦿ 2. Generate Assessment Status Report ( [Screen ▽] ) for
   [All Employees ▽]

○ 3. User Activity Information —— 804

○ 4. Create files for upload (submenu) —— 806

○ 5. Skill Set Reports (submenu) —— 808

○ 6. Skill Set Management (submenu) —— 810

○ 7. License/Certification Reports (submenu) —— 812

[Continue] —— 814

[Back] —— 816

Administrative Metrics 902 904

Figure 9:
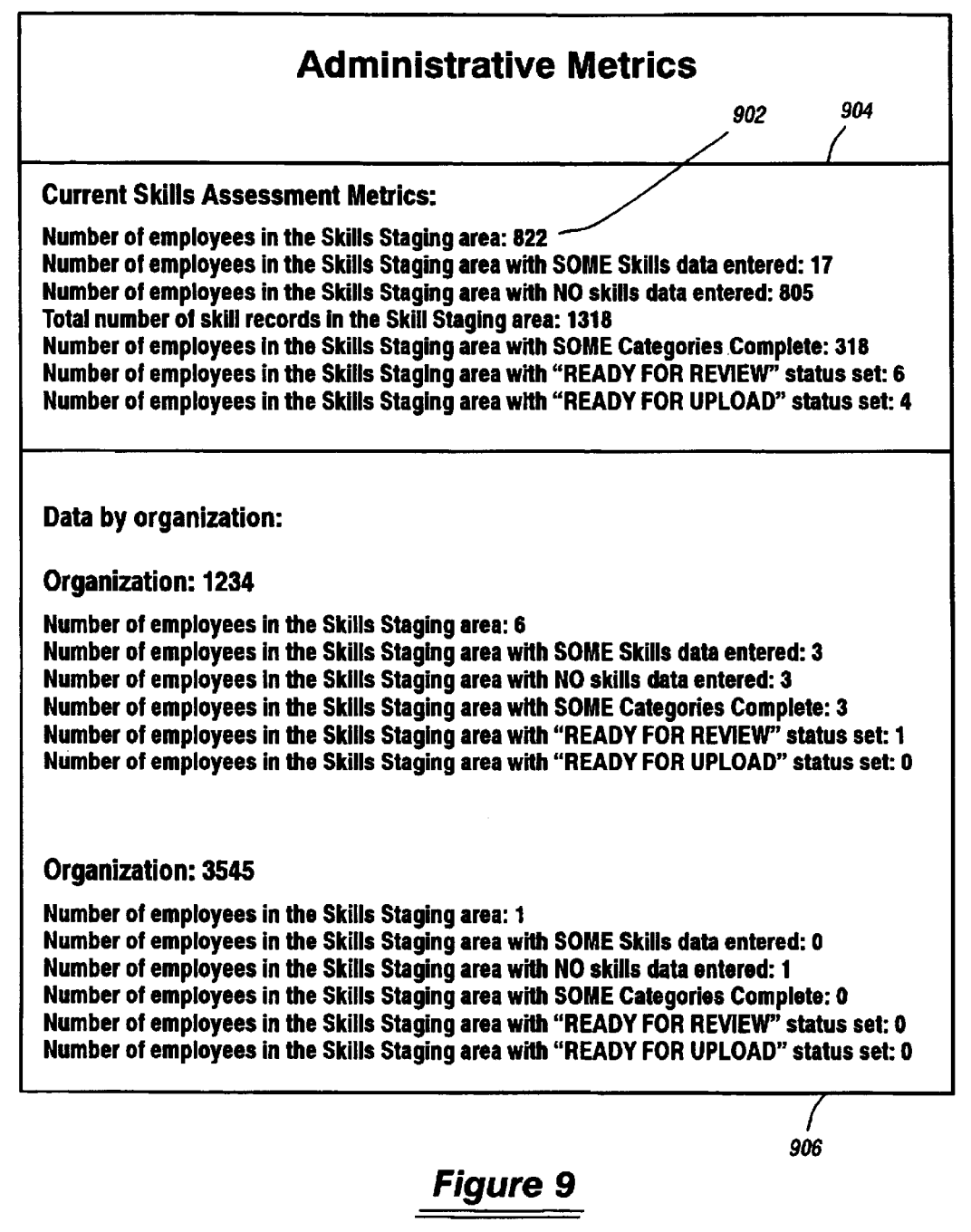

Current Skills Assessment Metrics:

Number of employees in the Skills Staging area: 822
Number of employees in the Skills Staging area with SOME Skills data entered: 17
Number of employees in the Skills Staging area with NO skills data entered: 805
Total number of skill records in the Skill Staging area: 1318
Number of employees in the Skills Staging area with SOME Categories Complete: 318
Number of employees in the Skills Staging area with "READY FOR REVIEW" status set: 6
Number of employees in the Skills Staging area with "READY FOR UPLOAD" status set: 4

Data by organization:

Organization: 1234

Number of employees in the Skills Staging area: 6
Number of employees in the Skills Staging area with SOME Skills data entered: 3
Number of employees in the Skills Staging area with NO skills data entered: 3
Number of employees in the Skills Staging area with SOME Categories Complete: 3
Number of employees in the Skills Staging area with "READY FOR REVIEW" status set: 1
Number of employees in the Skills Staging area with "READY FOR UPLOAD" status set: 0

Organization: 3545

Number of employees in the Skills Staging area: 1
Number of employees in the Skills Staging area with SOME Skills data entered: 0
Number of employees in the Skills Staging area with NO skills data entered: 1
Number of employees in the Skills Staging area with SOME Categories Complete: 0
Number of employees in the Skills Staging area with "READY FOR REVIEW" status set: 0
Number of employees in the Skills Staging area with "READY FOR UPLOAD" status set: 0

CDL Skill Assessment Status

The following table includes 'All Employees', sorted by Organization number and Manager.
Metrics are included at the end of the report.

1002 1004 1006 1008 1010 1012

| Org | Manager Name | Person Name | Person ID | Review Status Date | Upload Status Date | Last Upload Date |
|---|---|---|---|---|---|---|
| 1234 | Common James V | Fleishman, Gary P | 123456 | 1999-06-09 13:21:35 | | |
| | | Weyla, Robin | 654321 | | | |
| | | Dor, Michael L | 22222 | | | |
| | West, Michael D | Bell, Alexander G | 57114 | | | |
| | | Edison, Thomas A | 56901 | | | |
| | | Einstein, Albert E | 57704 | | | |
| 4100 | Bucher, Mary A | Crusher, Beverly | 41067 | 1999-04-27 07:05:20 | | |
| | | Data, Mr. | 40627 | 1999-04-27 07:09:20 | 1999-04-27 07:09:24 | |
| | | LaForge, Geordy | 36163 | | | |
| | | Picard, Jean Luc | 33555 | | | |
| | | Stooge, Curly | 37695 | | | |
| | | Stooge, Larry | 37043 | 1999-04-14 15:05:45 | 1999-04-14 15:05:49 | |
| | | Stooge, Moe | 37146 | | | |
| | | Worf, Mr. | 41683 | | | |

*Figure 10*

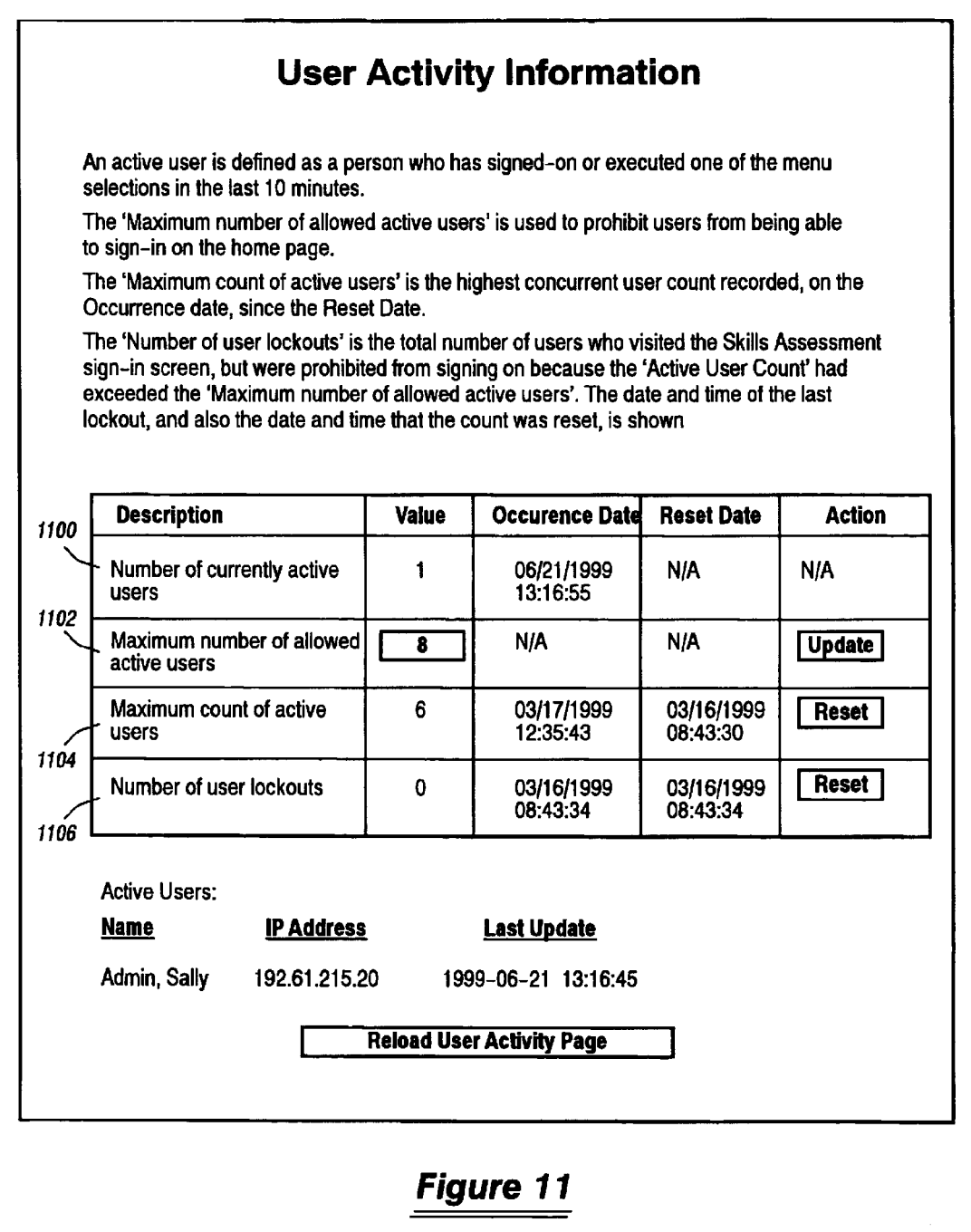

User Activity Information

An active user is defined as a person who has signed-on or executed one of the menu selections in the last 10 minutes.

The 'Maximum number of allowed active users' is used to prohibit users from being able to sign-in on the home page.

The 'Maximum count of active users' is the highest concurrent user count recorded, on the Occurrence date, since the Reset Date.

The 'Number of user lockouts' is the total number of users who visited the Skills Assessment sign-in screen, but were prohibited from signing on because the 'Active User Count' had exceeded the 'Maximum number of allowed active users'. The date and time of the last lockout, and also the date and time that the count was reset, is shown

| | Description | Value | Occurence Date | Reset Date | Action |
|---|---|---|---|---|---|
| 1100 | Number of currently active users | 1 | 06/21/1999 13:16:55 | N/A | N/A |
| 1102 | Maximum number of allowed active users | 8 | N/A | N/A | Update |
| 1104 | Maximum count of active users | 6 | 03/17/1999 12:35:43 | 03/16/1999 08:43:30 | Reset |
| 1106 | Number of user lockouts | 0 | 03/16/1999 08:43:34 | 03/16/1999 08:43:34 | Reset |

Active Users:

| Name | IP Address | Last Update |
|---|---|---|
| Admin, Sally | 192.61.215.20 | 1999-06-21 13:16:45 |

Reload User Activity Page

Figure 11

Skills Upload Options

Create a PRO Upload file by choosing one of the following:

1201

⊙ Create a PRO upload file for a Specific ID, where PRO ID:

1200 [ ]

○ Create a PRO upload file for all employees with "PRO UPLOAD STATUS COMPLETE".

1205    where Manager is  [ Any  ▽ ] — 1206
        and Organization is [ Any ▽ ] — 1204   1202
        Output a maximum of [ 100 ▽ ] users.

○ Create a PRO upload file for all employees

1207    Enter Field separator: [ ]

Clicking on "Create File" will generate an uploadable file with Certification and Skill data, and update the "Last Upload" timestamp in the database for all employees whose data is extracted.

[ Create File ] — 1208

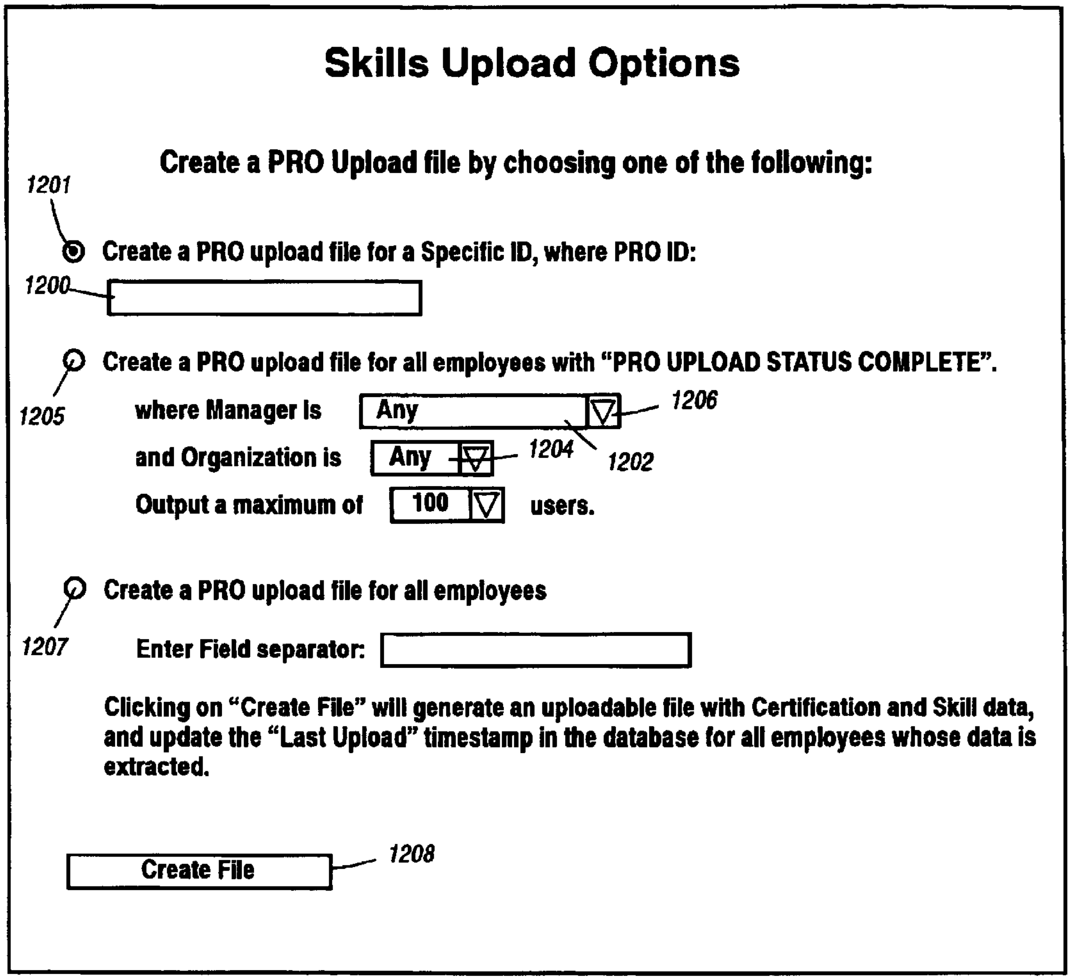

*Figure 12*

Skill Set Reports

Create a report based on the following selections:

Select Employee Subset:

1302 ○ Everyone in the database!

1304 ○ By Organization: [ 1234 ▽ ] 1303

1306 ○ By Employee hierarchy (all employees reporting directly to):
[ Atwood, John L ▽ ]
1307

1308 ● By Specific Employee: [ Atwood, John L ▽ ] 1309

1310
- Atwood, John
- Bixby, James L.
- Dagmart, Jane T.
- Kessler, Tomas
- Gunther, Max P.
- Martin, Polly M.
- Nagle, Judy G.
- Sundin, Georgia Select Skill Set for Report:

1312 ● MSSD Skill Set: [ Business Excellence (LAM) ▽ ]
1313

1314 ○ Reporting Skill Set:
[ 1100/2200 Series ▽ ] 1315

Select Type of Report: [ Summary (all employees grouped together) ▽ ] 1316

Select Report Output: [ File ▽ ]
1318

[ Generate Report ] — 1320

[ Back ] — 1322

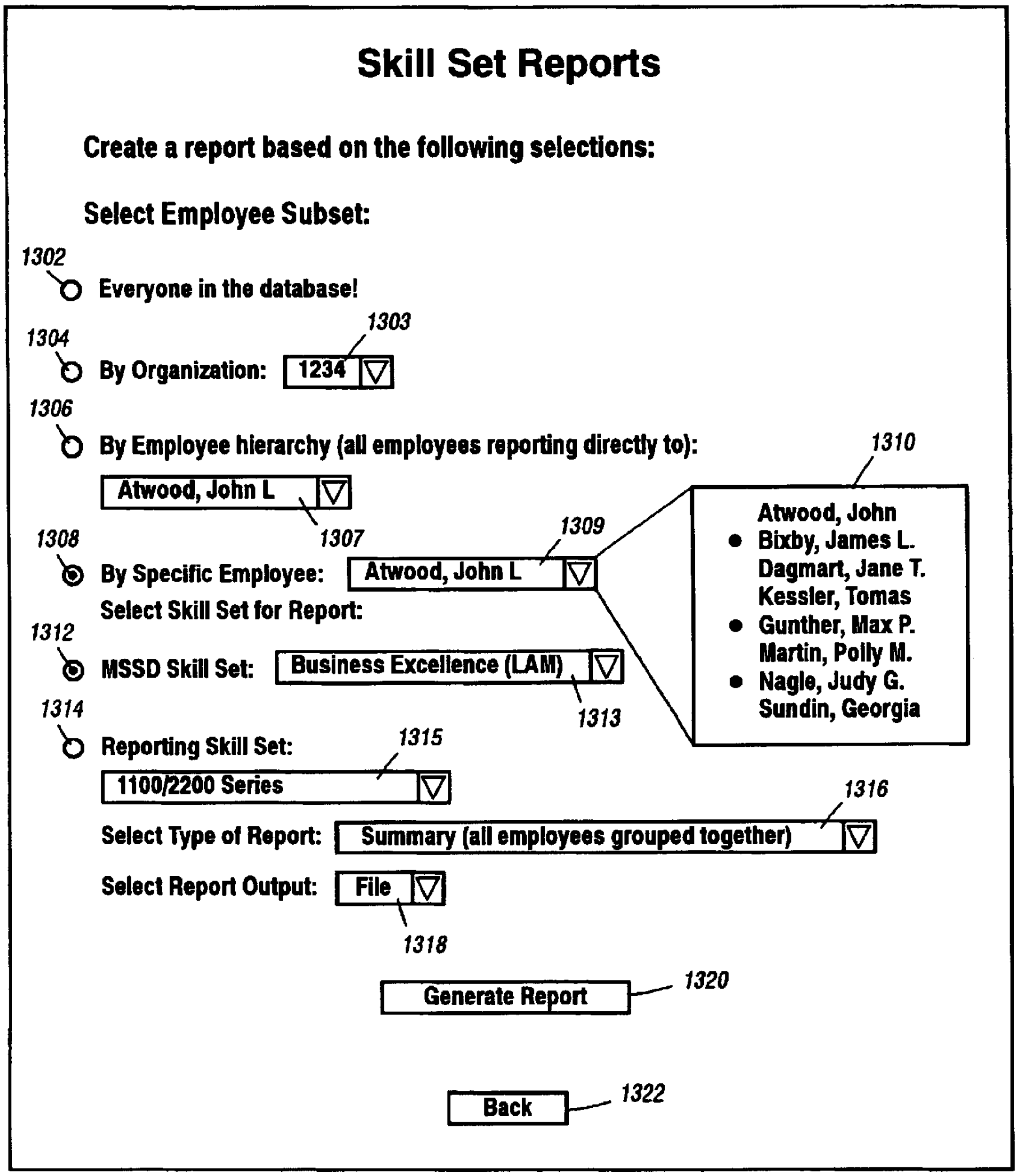

*Figure 13*

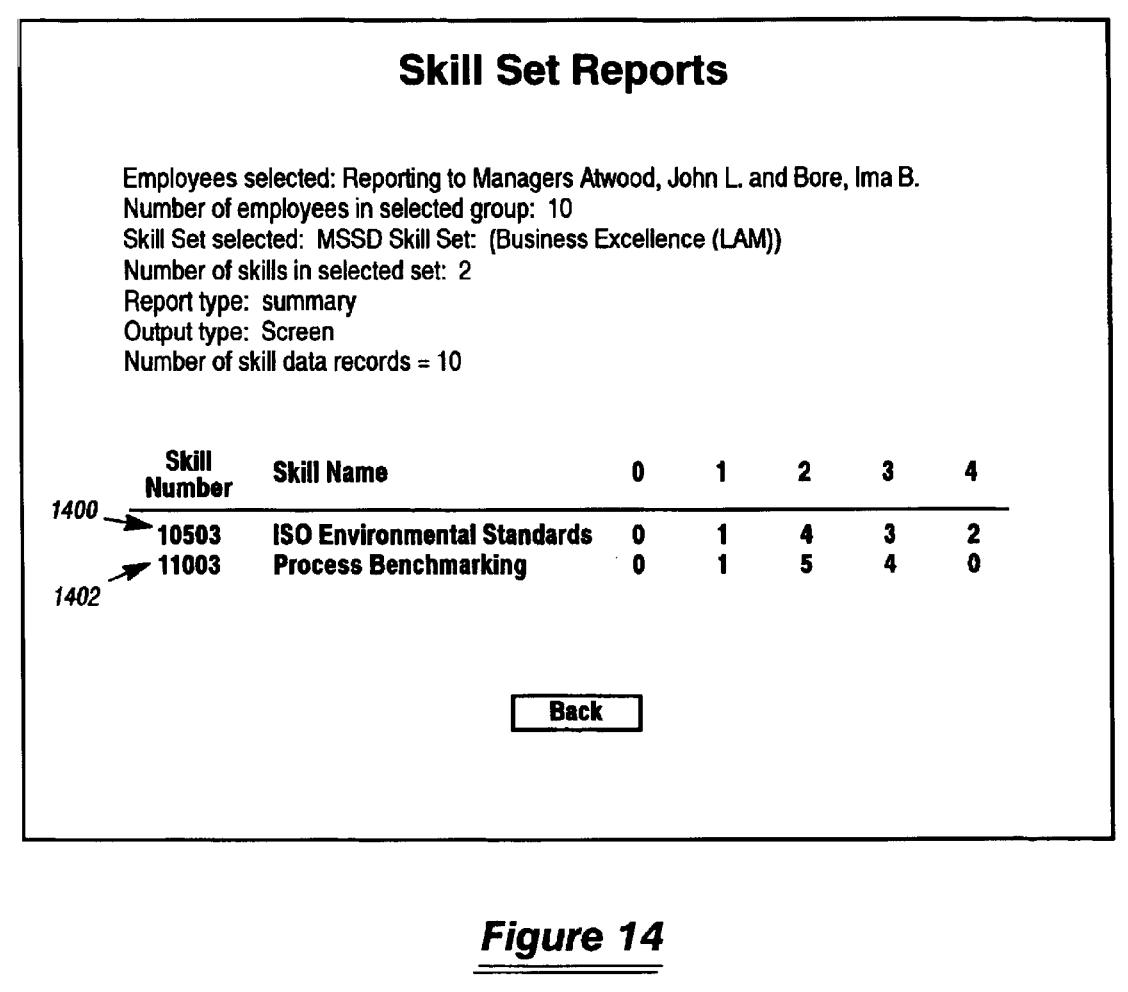

Skill Set Reports

Employees selected: Reporting to Managers Atwood, John L. and Bore, Ima B.
Number of employees in selected group: 10
Skill Set selected: MSSD Skill Set: (Business Excellence (LAM))
Number of skills in selected set: 2
Report type: summary
Output type: Screen
Number of skill data records = 10

| | Skill Number | Skill Name | 0 | 1 | 2 | 3 | 4 |
|---|---|---|---|---|---|---|---|
| 1400 | 10503 | ISO Environmental Standards | 0 | 1 | 4 | 3 | 2 |
| 1402 | 11003 | Process Benchmarking | 0 | 1 | 5 | 4 | 0 |

Back

*Figure 14*

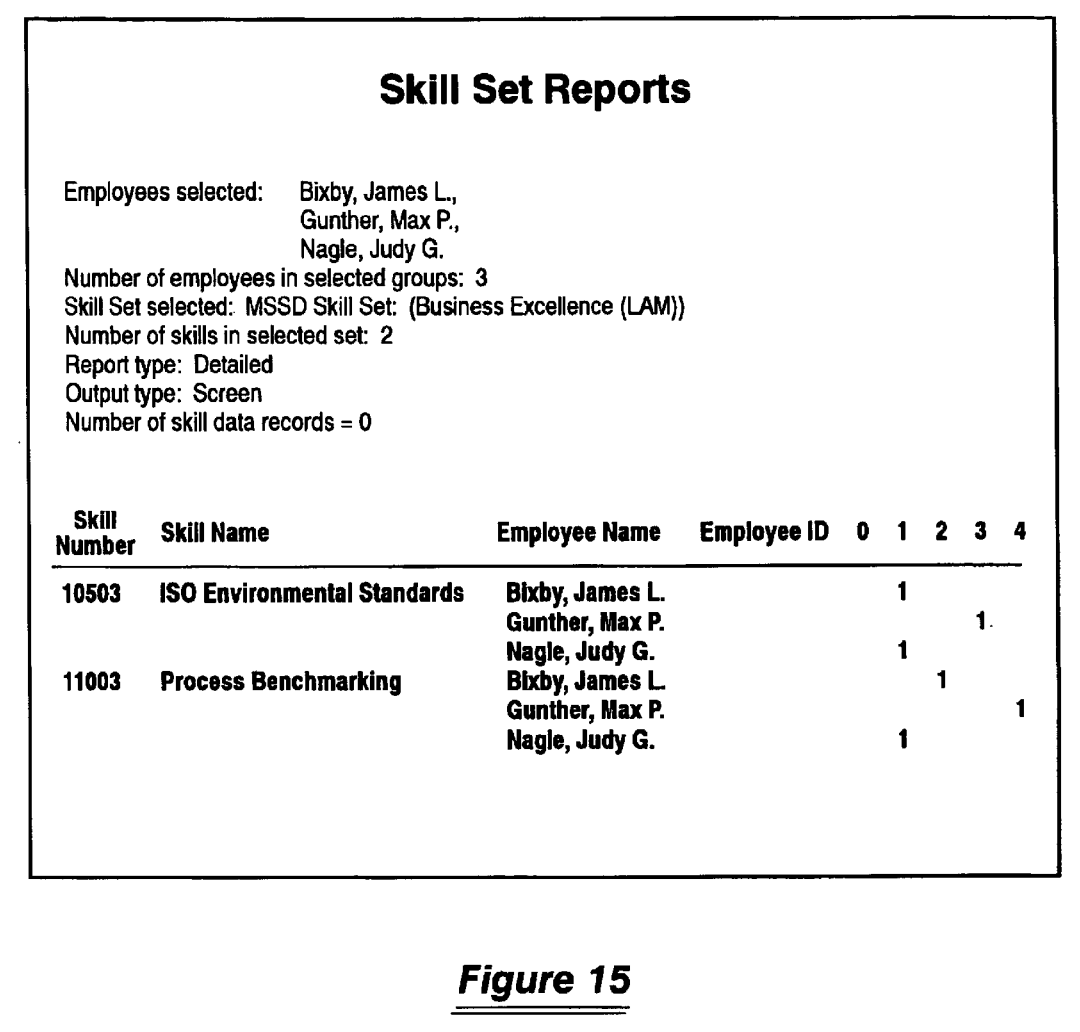

Skill Set Reports

Employees selected: Bixby, James L.,
Gunther, Max P.,
Nagle, Judy G.
Number of employees in selected groups: 3
Skill Set selected: MSSD Skill Set: (Business Excellence (LAM))
Number of skills in selected set: 2
Report type: Detailed
Output type: Screen
Number of skill data records = 0

| Skill Number | Skill Name | Employee Name | Employee ID | 0 | 1 | 2 | 3 | 4 |
|---|---|---|---|---|---|---|---|---|
| 10503 | ISO Environmental Standards | Bixby, James L. | | | 1 | | | |
| | | Gunther, Max P. | | | | | 1 | |
| | | Nagle, Judy G. | | | 1 | | | |
| 11003 | Process Benchmarking | Bixby, James L. | | | | 1 | | |
| | | Gunther, Max P. | | | | | | 1 |
| | | Nagle, Judy G. | | | 1 | | | |

*Figure 15*

License/Certification Reports

Create a report based on the following selections:

Select Employee Subset:

1600 ○ Everyone in the database!

1602 ◉ By Organization: [ 1234 ▽ ]

1604 ○ By Employee hierarchy (all employees reporting directly to):
[ Atwood, John L ▽ ]

1606 ○ By Specific Employee: [ Abner, Regina P ▽ ]

Select Report Output: [ File ▽ ]
1608

[ Generate Report ] — 1610

[ Back ] — 1612

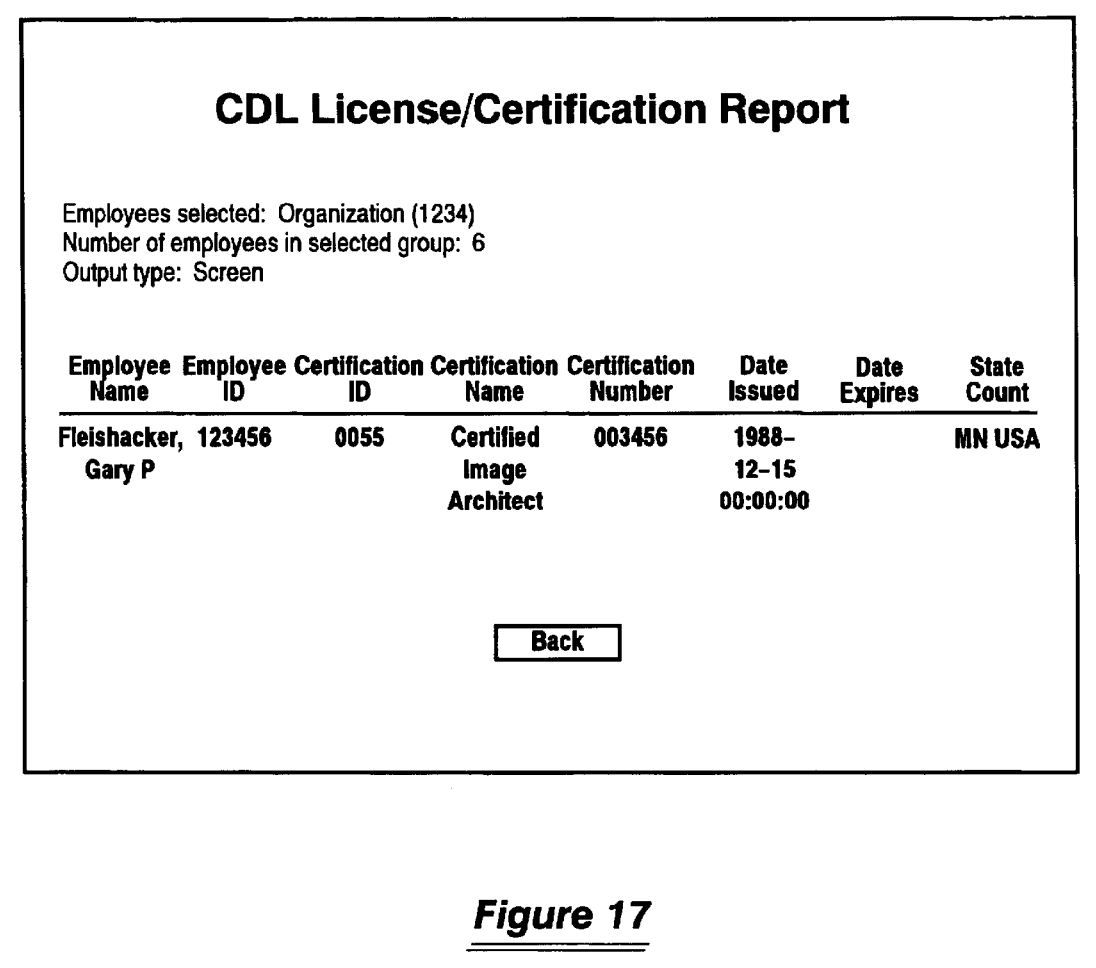

CDL License/Certification Report

Employees selected: Organization (1234)
Number of employees in selected group: 6
Output type: Screen

| Employee Name | Employee ID | Certification ID | Certification Name | Certification Number | Date Issued | Date Expires | State Count |
|---|---|---|---|---|---|---|---|
| Fleishacker, Gary P | 123456 | 0055 | Certified Image Architect | 003456 | 1988-12-15 00:00:00 | | MN USA |

Back

*Figure 17*

SYSTEM AND METHOD FOR EVALUATING A SELECTABLE GROUP OF PEOPLE AGAINST A SELECTABLE SET OF SKILLS

BACKGROUND OF THE INVENTION

1. Field of the Invention

This invention relates generally to an improved system and method for performing skill set analysis, and more particularly, relates to a system and method for managing skill assessment data and for allowing a dynamically-selected set of skills to be reported for a dynamically-selected group of people.

2. Description of the Prior Art

In today's competitive marketplace, employers are often seeking ways to evaluate and improve the effectiveness of their workforces. One way to accomplish this evaluation process is to assess the skills possessed by their employees. The assessment information can be used to make informed employment and staffing decisions. This information may also be used to award compensation adjustments, to grant promotions, or to offer incentives that encourage employees to acquire additional skills. Training programs may be developed to compensate for deficiencies uncovered by the skill assessment process.

Skill assessment may be performed by an employee's management. More often, however, the skill evaluation process will initially be completed by employees themselves. Each employee may be required to rate his proficiency at performing a set of skills considered important for adequately performing his job. Sometimes this skill assessment process may be performed manually. Alternatively, it may be performed with the aid of an automated skill assessment tool running on a data processing system.

Several skill assessment tools are available commercially. These tools generally allow a set of skills to be entered into a database for use in performing the assessment process. Initially, this skill set will be defined when the tool is installed for use, and can be modified during the life of the tool. The skill set will usually include all skills related to any employee located anywhere in the entity employing the skill assessment tool. For example, an automobile manufacturer may define the skill set to include all skills related to all of its employees, including those employees in engineering, manufacturing, marketing, managerial, and accounting positions. This comprehensive skill set may include thousands of unrelated skills ranging from those skills associated with assembly line techniques to skills relating to knowledge on acceptable accounting practices. The employees in the corporation will use this skill set when performing the self-evaluation process.

In addition to containing a centralized skill database, many skill assessment tools also generally include a single repository used to store the names of employees that will be performing the skill assessment process. If the employer is large and diverse, this database will include employees associated with many different aspects of a business. For instance, an employee database associated with the automobile manufacturing entity of the above example will include employees engaged in many different activities including accounting, engineering, manufacturing, and marketing.

The use of a centralized skill database and employee repository is beneficial for several reasons. By using centralized databases, any employee can access the same skill set to complete the skill assessment process. A uniform process may be readily instituted by a given employer regardless of the employer's size and organizational structure. Additionally, because the skill assessment data is centrally located, administrators of the assessment process may more readily manage the database and the process itself Although use of a large centralized skill assessment database may allow data entry to proceed more efficiently, the amount and diversity of the assessment data makes it more difficult to report on, and to analyze in a meaningful manner. For example, for a large, diverse employment entity, merely reporting all skill assessment data for all employees does not provide information that is useful on a department-by-department basis. A given department within an employment entity will most likely want to analyze assessment data associated with a particular subset of the comprehensive skill set, or a particular subset of the employee population. Furthermore, for any given department, the specific set of skills and employees that are of interest when reviewing the skill assessment data may change depending on the reason that data is being reviewed. For instance, when making hiring or training decisions, an accounting department will most likely be concerned with the accounting-related skills possessed by the people then-employed by that department. This department will most likely be disinterested in the accounting skills possessed by the rest of the employee population, and will likewise be unconcerned with the manufacturing skills possessed by the employees within the accounting department. Similarly, if a particular training program is being instituted for a subset of the employees within the accounting department, only the skill assessment data involving the program participants and those skills associated with the training curriculum are of interest. The subsets of skills and employees used for this purpose may be different from those subsets considered useful when making the staffing decisions.

Prior art skill assessment tools generally provide reporting functions to report all skill assessment data included within a skill assessment database. The user is then responsible for selecting that portion of the reported data that is applicable to the users needs. This may be a time-consuming process. Moreover, the resulting data may not be presented in a user-friendly manner. In such systems, if any re-selection of employee subsets or skill sets is to occur, actual modification of the tool software must be performed.

What is needed, therefore, is a skill assessment tool that allows a subset of employees and/or a subset of skills to be selected for use in generating reports for analyzing the skill assessment data. The tool should provide a means of allowing employee and skill subsets to be dynamically reselected so that new reports may be generated without the need to make modifications to the system.

OBJECTS

It is a primary object of the current invention to provide an improved system and method for administering skill assessment data;

It is another object to provide an administrative system for a skill assessment tool that is capable of reporting skill assessment data using a selectable subset of those skills that may be assessed by the tool;

It is yet another object to provide an administrative system for a skill assessment tool that is capable of reporting skill assessment data using a selectable subset of the skills that may be assessed by the tool, wherein the subset is selected by specifying one or more predefined groups of the skills;

It is a further object to provide an administrative system for a skill assessment tool that is capable of reporting skill assessment data entered by a selectable subset of the users of the skill assessment tool;

It is yet another object to provide an administrative system for a skill assessment tool that is capable of reporting skill assessment data using a selectable subset of the users of the skill assessment tool, wherein the subset of users is selected by specifying one or more predefined groups of the users;

It is yet another object to provide an administrative system for a skill assessment tool that is capable of reporting skill assessment data using a selectable subset of the users of the skill assessment tool, wherein the subset of users is selected by specifying an employee hierarchy associated with the users;

It is another object to provide an administrative system for a skill assessment tool that is capable of reporting skill assessment data in a summary format for a selectable subset of the users;

It is another object to provide an administrative system for a skill assessment tool that is capable of reporting skill assessment data in a detailed format for a selectable subset of the users;

It is a further object to provide an administrative system for a skill assessment tool that is capable of adjusting the selectable subset of the users and the selectable subset of the skills dynamically without requiring reconfiguration of the administrative system;

It is still another object to provide an administrative system for a skill assessment tool that is capable of providing licensing and certification data for a selectable subset of the users;

It is another object to provide an administrative system for a skill assessment tool that is capable of reporting on the progress of the users in completing the skill assessment process; and It is still a further object to provide an administrative system for a skill assessment tool that is capable of reporting on user activity for the skill assessment tool.

Still other objects and advantages of the present invention will become readily apparent to those skilled in the art from the following detailed description of the preferred embodiment and the drawings, wherein only the preferred embodiment of the invention is shown, simply by way of illustration of the best mode contemplated for carrying out the invention. As will be realized, the invention is capable of other and different embodiments, and its several details are capable of modifications in various respects, all without departing from the invention. Accordingly, the drawings and description are to be regarded to the extent of applicable law as illustrative in nature and not as restrictive.

BRIEF DESCRIPTION OF THE FIGURES

The present invention will be described with reference to the accompanying drawings.

FIG. 4 is a menu provided by Software Means for allowing a user to define and manage various ones of the Minimum Skill Set Definitions;

FIG. 5 is a screen display provided after a user selects the Skills Assessment Function "Skills List";

FIG. 6 is a menu provided by Software Means following selection of the "Licenses/Certifications" function;

FIG. 7 is a screen display indicating those licenses and/or certifications that are required for a given user by that user's corporate division;

FIG. 9 is a screen display that is provided following selection of the function "Generate Skills Assessment Metrics";

FIG. 10 is a screen display that is provided following selection of the function "Generate Assessment Status Report";

FIG. 11 is a screen display that is provided following selection of the function "User Activity Information";

FIG. 12 is a screen display that is provided following selection of the function "Create files for upload";

FIG. 13 is a screen display that is provided following selection of the function "Skill Set Reports";

FIG. 14 is a display of a report generated using the summary format selected by the format selection function;

FIG. 15 is a display of a report generated using the detailed format selected by the format selection function;

FIG. 17 is a display of a report generated using the Licensing/Certification Reports function.

SUMMARY OF THE INVENTION

Figure 1:
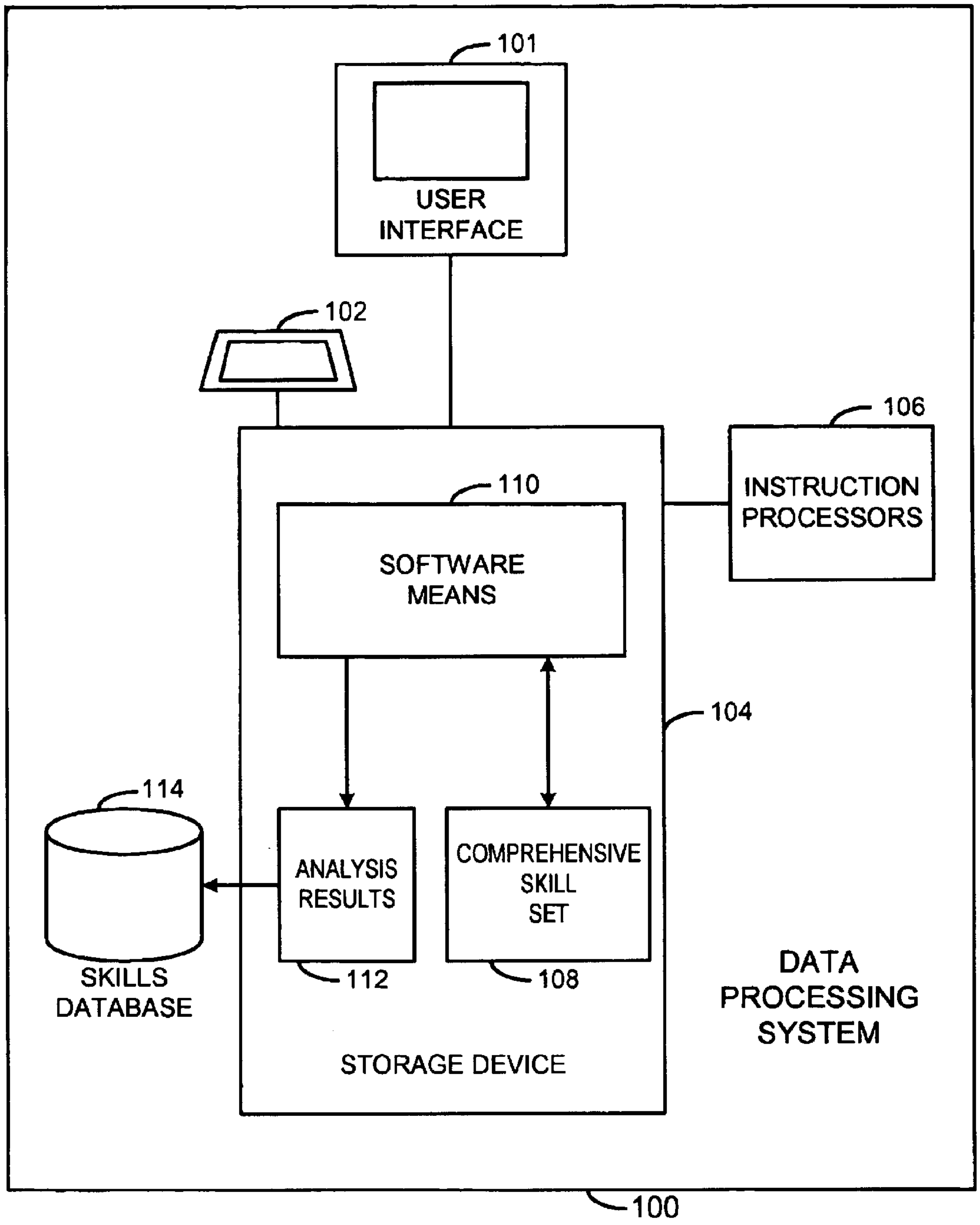
FIG. 1 is a block diagram of Data Processing System for use with a skill set analysis tool.

The forgoing objects and other objects and advantages are provided in the current invention, which is an improved administration system for a skill set assessment tool. The administration system allows skill set data to be reported in a manner that is tailored to the needs of individual users. The skill set assessment tool of the preferred embodiment may include a large set of possibly-unrelated skills. Users of the tool rate their proficiency at performing ones of these skills. The assessment tool may be employed by a large, diverse user population, and the resulting skill assessment data may therefore be both extensive and diverse.

To aid in administration of skill assessment data, the current invention allows for the reporting of skill assessment data for a selectable subset of the users supported by the system. Reporting may also be performed using a subset of the skills included in the skill set that is supported by the system. A selection menu is provided to allow both the subset of users and subset of skills to be readily re-selected such that new reports may be generated dynamically without changing or reconfiguring the assessment tool software. The assessment tool may therefore be readily adapted for use in management planning sessions that require the use of many different data sets.

According to one aspect of the invention, the subset of users may be selected using a variety of selection criteria. One or more users may be selected by user name. Additionally, the users may be organized into groups, with ones of the users that are included in specified groups being added to the selected subset of users. Users may also be organized into a hierarchical management structure, and ones of the users reporting to specified management personnel may be added to the selected user subset. Any combination of the selection criteria may also be used to accomplish the user selection process.

According to another aspect of the invention, named sets of skills may be defined by one or more users of the assessment tool. These named skill sets each include a subset of the skills supported by the assessment tool, and are available for various purposes within the skill assessment tool. One or more selected ones of these skill sets may be combined so that any skill included in any selected skill set is added to the selected skill subset used during report generation. This provides an efficient and flexible means of defining the subset of skills that is useful for a given purpose.

In addition to managing skill assessment data, the current administration system also manages and reports licensing and certification data. This data may be reported for a selected subset of users, wherein this subset may be selected using any of the selection criteria discussed above.

The administration system of the current invention allows skill assessment reports to be generated in either a summary or a detailed format. The summary format provides collective information regarding the proficiency of the selected subset of users at performing the skills included in a selected skill subset. The detailed format expands the summary format to include proficiency information on a user-by-user basis for each of the skills in the selected skill subset.

Another aspect of the administration system relates to the reporting of the status related to the assessment process and to tool usage. A user activity function may be selected to obtain information regarding the number of users concurrently employing the assessment tool. A second administration function provides general metrics related to the progress made by the user population in entering assessment data. An assessment status function is provided to report, on a user-by-user basis, the extent of the completion of the assessment process.

Still other objects and advantages of the present invention will become readily apparent to those skilled in the art from the following detailed description of the preferred embodiment and the drawings, wherein only the preferred embodiment of the invention is shown, simply by way of illustration of the best mode contemplated for carrying out the invention. As will be realized, the invention is capable of other and different embodiments, and its several details are capable of modifications in various respects, all without departing from the invention. Accordingly, the drawings and description are to be regarded to the extent of applicable law as illustrative in nature and not as restrictive.

DETAILED DESCRIPTION OF THE PREFERRED EMBODIMENTS

FIG. 1 is a block diagram of Data Processing System 100 that may support a skill set analysis tool. Data Processing System includes User Interface 101 such as a display monitor and a Data Entry Means 102 such as a keyboard and/or a point-and-click device. The User Interface and Data Entry Means are coupled to a Storage Device 104. This Storage Device is further coupled to one or more Instruction Processors 106 that provide the capability to manipulate and process data signals stored in Storage Device 104. Storage Device 104 stores a set of data signals defining a Comprehensive Skill Set (CSS) shown in Block 108. This CSS defines a comprehensive list of all skills that are to be used for analysis purposes by the users of the system. Storage Device 104 further stores Software Means shown in Block 110 that defines the process whereby users may utilize User Interface 101 and Data Entry Means 102 to display the CSS, and to further perform skill set analysis using this CSS. The results of the skill set analysis, shown as Analysis Results in Block 112, may be stored in Storage Device 104 or on some other storage means. In the preferred embodiment, the Analysis Results can be loaded into a central Skills Database 114, wherein this data is available for making hiring, training, and staffing decisions, or in awarding compensation adjustments or promotions.

As discussed above, CSS 108 includes a comprehensive list of all skills defined in the system. For a given business entity, the CSS could include skills relating to all areas of the business endeavor, including marketing, managing, manufacturing, accounting, product development, and any other task performed within that entity. As will be readily appreciated, any given user of the system will be interested in performing skill analysis using a sub-set of the entire CSS. For example, an employee in the marketing department will most likely perform skill analysis for those skills pertaining to marketing activities, and will not likely be interested in performing skill assessment using skills related to product development tasks. The current skill set assessment tool provides a system and method that allows a user to perform assessment on only those skills that are actually applicable to the user and the user's employment. Because a user is not required to assess, or even review, the entire CSS, skill analysis can be completed much more quickly, as discussed further below.

Figure 2:
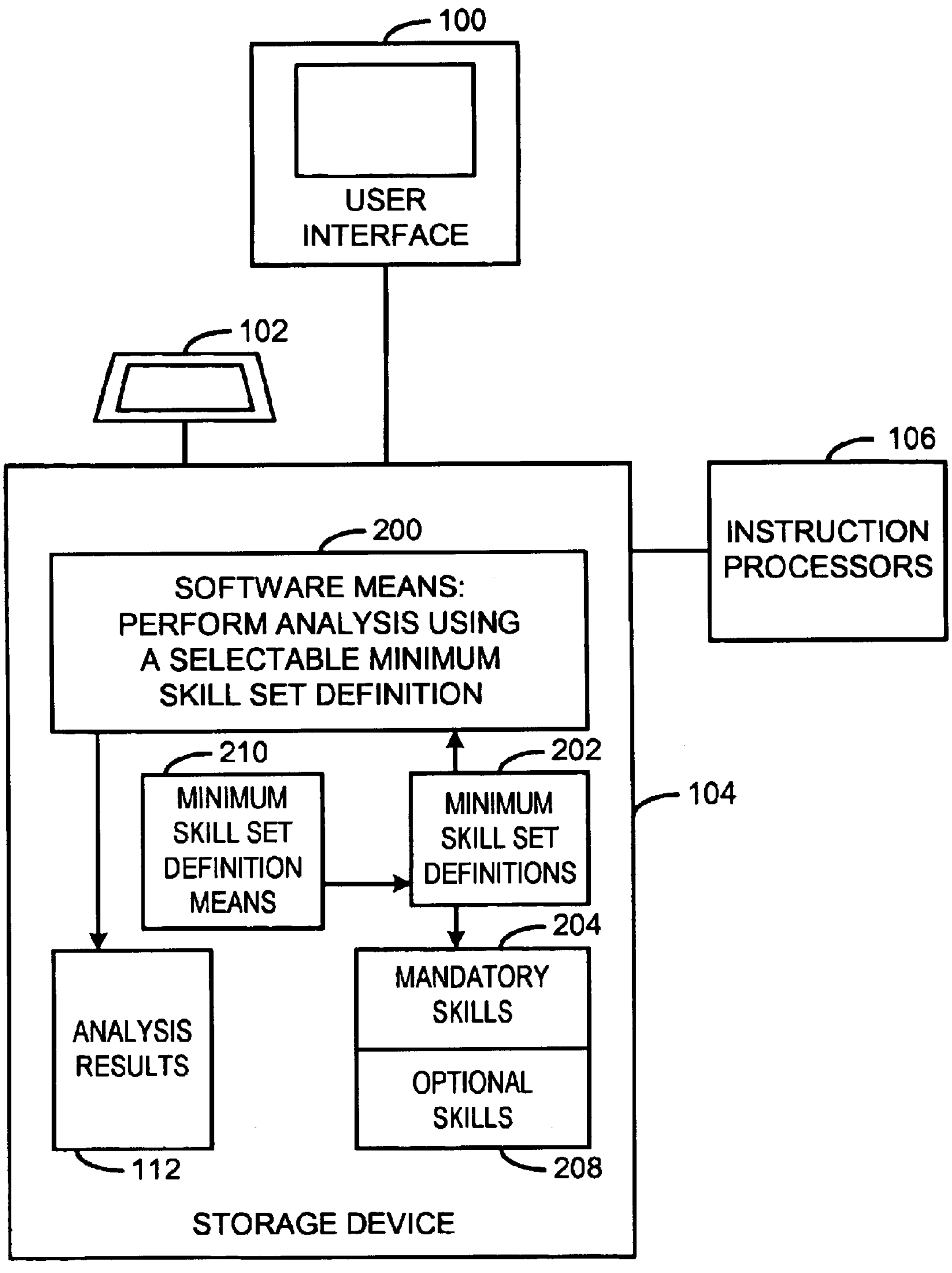
FIG. 2 is a block diagram of the skill set analysis tool of the current invention.

FIG. 2 is a block diagram of the skill set analysis tool of the current invention. Software Means 200 has access to a set of Minimum Skill Set Definitions (MSSDs) shown in Block 202. Each MSSD is selectable for any given user, and may be used as a filter such that during the skill set analysis process, a user need only review those skills shown as Mandatory Skills in Block 204 that are actually relevant to his employment expectations. That is, the Mandatory Skills are the skills that must be assessed for the analysis of the selected MSSD to be considered complete. All other skills in the CSS are considered Optional Skills, as shown in Block 208. The assessment process may, but need not, be completed for these Optional Skills. The MSSDs are defined using the Minimum Skill Set Definition Means 210 of Software Means 200. The use and definition of these MSSDs is largely beyond the scope of this application, and is described in detail the co-pending application entitled "System and Method for Performing Skill Set Assessment Using a Hierarchical Minimum Skill Set Definition" (hereinafter, Co-pending Application) incorporated herein by reference in its entirety.

Figure 3:
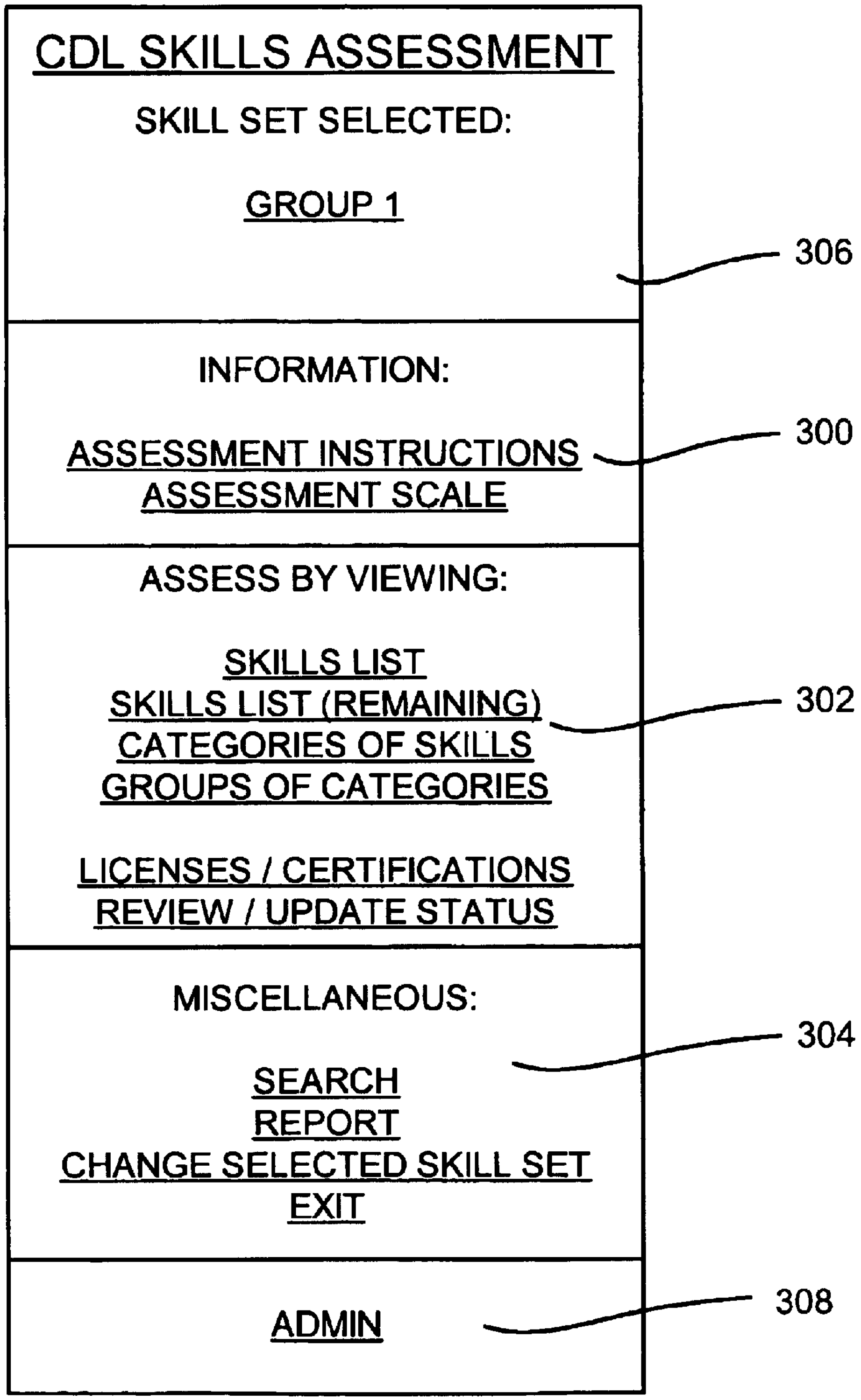
FIG. 3 is the main menu provided by Software Means upon invocation of the skill set analysis tool of the current invention.

FIG. 3 is the main user menu provided by Software Means 200 upon invocation of the skill set analysis tool of the current invention. The functions provided by the skill set analysis tool may be divided into several categories. A first category shown in Block 300 includes command selections such as "Assessment Instructions" that provide the user with information regarding the operation and use of the tool. These command selections may be described as "Help" functions. A second function category shown in Block 302 includes Assessment Functions used by a user to enter skill set analysis data. Each of these functions provides a different view of the Skill Set data. The use of these functions is largely beyond the scope of the current Application, and is described in detail in the Co-pending Application. A third function category shown in Block 304 provides Miscellaneous Functions, including the "Change Selected Skill Set"

function that allows the user to select a skill set for use in the skill set assessment process. A Skill Set must be selected before the user may utilize various ones of the Assessment Functions to enter skill set assessment data. In the example provided by FIG. 3, Skill Set "Group 1" is selected as shown in Block 306. This Skill Set includes a subset of the skills included in the Comprehensive Skill Set. This subset may, for example, pertain to employment responsibilities for employees of "Group 1".

Another group of functions is shown in Block 308 under the heading "Admin". Selection of this functional category provides the user with a sub-menu including various reporting capabilities to be used in manipulating and reporting the Analysis Results 112 in a meaningful way based on user selections. The generated reports can be used by management personnel to make informed management decisions. The various Administrative Functions provided by the current skill set assessment tool are the subject of this Application, and are described in detail below.

Before describing the Administrative Functions, a brief description is provided concerning the definition of Skill Sets and the use of Skill Sets in performing the assessment process. The Co-pending Application may be referenced for a more detailed description of these topics.

FIG. 4 is an illustration of a screen provided to allow for the creation and deletion of Skill Sets. These Skill Sets, also referred to as Skill Report Clusters, are named subsets of the Comprehensive Skill Set. Two types of Skill Sets may be defined, including "Reporting" Skills Sets and "MSSD" Skill Sets. Reporting Skill Sets define a subset of skills included in the CSS that will be used to generate reports. To create a Reporting Skill Set, the name of the Skill Set and the name of the author are entered in Blocks 400 and 402, respectively, and the Skill Set type is indicated by selecting the "Reporting" Skill Set Designator 404. The initial set of skills to be added to the Skill Set is selected within Selection Block 406. This can be accomplished using a series of keystrokes, a point-and-click device, or any other selection method known in the art. Then the "Create Skill Set" function 408 is used to create the named Skill Set. The skills included in the newly-created Skill Set are then illustrated in Block 410. This Skill Set may be modified by selecting additional skills from Selection Box 406, then selecting the "Add to Skill Set" function 412. This causes the newly-selected skill to also appear in the display in Block 410. Skills may be deleted from the Skill Set by selecting a skill in display Block 410, then selecting the "Delete from Skill Set" function 414. When the definition is completed, the named Reporting Skill Set is available for report generation in a manner to be discussed below. A named Skill Set may be deleted using the Delete Skill Set function 416.

A second type of Skill Set, referred to as an "MSSD" Skill Set is used to define one or more Minimum Skill Set Definitions (MSSDs). As discussed above, an MSSD is used during entry of assessment data so that the user does not need to review all skills in the Comprehensive Skill Set during the skill assessment process. This type of Skill Set is created in a manner similar to that described above in reference to a Reporting Skill Set. In this case, however, the type of Skill Set is selected by selecting the "MSSD" Skill Set Designator 418. Additionally, a "parent/child" relationship is defined between the Skill Set being created and another existing MSSD Skill Set. This relationship is defined by naming an existing MSSD Skill Set as the current Skill Set's "parent" in Block 420. A list of all existing MSSD Skill Sets can be obtained using Expansion Arrow 422 for use in selecting the parent Skill Set. After all selection data has been specified, the MSSD Skill Set may then be created using the "Create Skill Set" function in the manner discussed above.

MSSD Skill Sets are used for two purposes. As discussed above, they are used to define MSSDs that are, in turn, used during the entry of skill assessment data. The creation of MSSDs is largely beyond the scope of this Application, and it may be simply stated that the parent/child relationships defined for MSSD Skill Sets arrange each of the MSSD Skill Sets into a hierarchical tree structure. This hierarchical tree structure is then used to create an MSSD that includes all skills included in predetermined ones of the MSSD Skill Sets. The creation of MSSDs using the MSSD Skill Sets is described in detail in the Co-Pending Application.

The use of MSSDs makes entry of the skill assessment data easier for users because only skills included in the selected MSSD need to be reviewed during the assessment process. The selected MSSD may be chosen by a user prior to performing skill assessment, or the MSSD may be automatically assigned to the user by the skill set tool. An MSSD assignment may be performed when the user signs onto the system using a unique user identification and password. The assignment will generally be based on the user's employment position, and will select an MSSD including only those skills applicable to the user.

Following selection of a MSSD, the user may begin the assessment process using the Assessment Functions shown in Block 302. As noted above, the Assessment Functions shown in Block 302 of FIG. 3 provide a variety of mechanisms to view, and to enter assessment data, for the list of skills included in the selected MSSD. These functions allow the user to evaluate his or her proficiency in performing the various skills included in the MSSD. The user is allowed to enter additional data for skills not included in the MSSD, but entry of this additional data is considered optional.

In addition to being used to create MSSDs, the MSSD Skill Sets may also be used to generate reports, just as Reporting Skill Sets may be used to generate reports. The manner in which this is accomplished is discussed below.

FIG. 5 is a screen display provided after a user selects the Skills Assessment Function "Skills List" shown in Block 302. A list of skills included in the selected Skill Set called "Group 1" is provided. In the preferred embodiment, this list is grouped into categories wherein each category includes a group of related skills. The skills could be arranged and presented in many other ways, including as an alphabetical listing. Block 500 of FIG. 5 shows the list of skills for the category "Engineering and Design Tools" that are included in the selected MSSD called "Group 1". A user may rate his proficiency at performing the listed skills, then mark the category as completed using the completion indicator in Block 502. Then the user may select the "Save" function in Block 504 to save the data as Analysis Results 112. The user continues with the assessment process until all skills included in the MSSD are completed.

When the assessment process is completed, the user employs the "Review/Update Status" function of the Assessment Functions of Block 302 (FIG. 3) to modify the status associated with the assessment data. Upon selection of the Review/Update Status function, the user is provided with a menu that allows the now-completed assessment data to be marked as "Ready for Review". This status indicates to the employee's management that an employee review may now be scheduled to discuss the completed assessment data. After the review is completed, the assessment data may then be uploaded from Storage Device 104 to Skills Database 114 by using the Review/Update Status function to change the assessment data status to "Ready for Upload". The use of the Review/Update Status function is largely beyond the scope of this Application, and is described in detail in the Co-Pending Application.

In addition to skill assessment data, a user of the current assessment tool may also enter licensing and certification data. The entry of such data is accomplished by selecting the "Licenses/Certifications" selection shown in Block 302 of FIG. 3.

FIG. 6 is a menu provided by Software Means 200 following selection of the "Licenses/Certifications" function shown in the main menu of FIG. 3. This menu allows a user to obtain a list of those licenses and certifications that are required for the user's current employment position. This list of licenses and certifications may be included in the selected Minimum Skill Set Definitions. According to the preferred embodiment, the user may view these requirements by selecting one of the functions 600, 602, or 604. In this embodiment, the user may view those licenses and/or certifications required by the user's corporate entity by selecting function 600. Those licenses and/or certifications required by the user's corporate division are viewed by selecting function 602, and those licenses and/or certifications required by a user's group may be viewed by selecting function 604. The additional licenses and/or certifications that are required by other entities within the corporation that are not applicable to the current user are viewed by selecting one of the functions in Block 606. The user may return to the previous screen by selecting the Back function 608. In an alternative embodiment, all licenses and/or certifications required for a given user could be included on a single list and displayed using one display function. The licensing and certification data may be organized in many other ways depending on the structure of the entity employing the current tool.

FIG. 7 is a screen display indicating those licenses and/or certifications that are required for a given user by that user's corporate division, which for this example is "Division 1 Requirements". This screen display is provided in response to the user's selection of function 602 from the screen display of FIG. 6. Similar displays are provided in response to selection of functions 600 or 604. This screen allows for entry of data regarding those certifications or licenses that are required, including information pertaining to the issue and expiration dates of the applicable certifications or licenses. As in other screen displays discussed above, this display provides a "Back" function 700 to return to a previous display, and a "Save" function 702 to allow the user to save any entered data as Analysis Results 112.

Administrative Reporting Functions

As discussed above, the skill assessment tool of the current invention provides various administrative and reporting functions that allow the skill assessment data provided by the users to be presented in a meaningful and useful manner based on selectable criteria. Using these functions, the current tool may be used to make a wide array of management decisions, including staffing, training, and compensation decisions.

Figure 8:
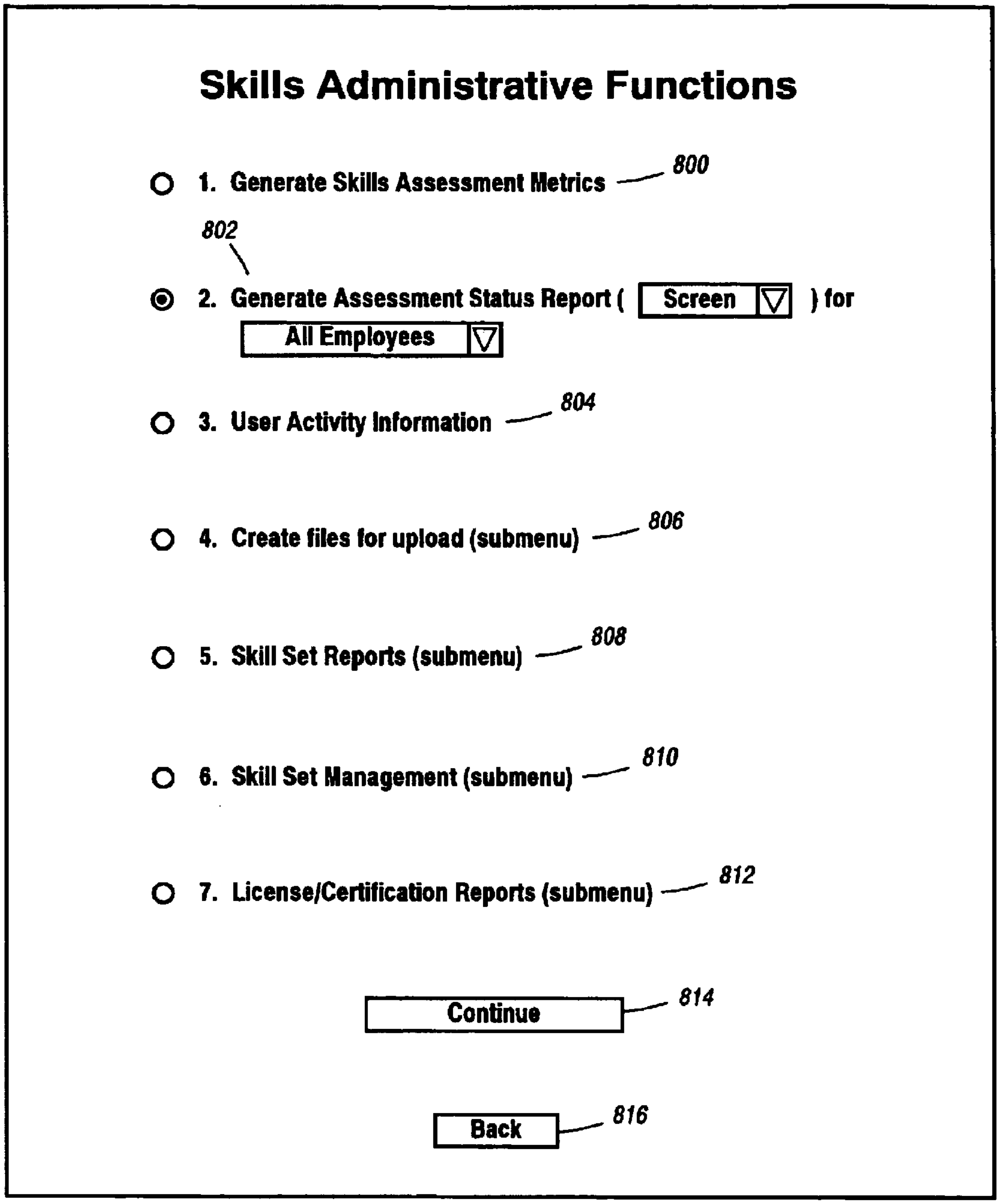
FIG. 8 is a screen display that is provided following selection of the "Admin" function.

FIG. 8 is a screen display that is provided following selection of the "Admin" function category 308 of FIG. 3. This screen provides a menu of administrative functions available to manipulate and report the Analysis Results 112 entered by users of the current skill assessment tool. The first menu selection is shown as "Generate Skills Assessment Metrics" 800, which is used to report the status of the assessment process.

FIG. 9 is a screen display that is provided following selection of the function "Generate Skills Assessment Metrics" 800 shown in FIG. 8. This screen display provides information such as the number of employees that are expected to enter skill assessment data. This is shown as "Number of employees in the Skills Staging area" 902, wherein the "Skills Staging area" refers to data stored in Storage Device 104. The screen of FIG. 9 further includes information such as the total number of skills in the Comprehensive Skill Set, the number of users that have started, but not yet completed, assessment of all skills in their applicable MSSD, and the number of users that have completed the skill assessment process and are either ready to upload the Analysis Results to the Skills Database 114, or use those results as the basis for an employee review. In addition to providing this information in a cumulative format as shown on the top half of the screen display in Block 904, the data is also listed according to organizations in Block 906. Exemplary data is shown for organizations "1234" and "3545".

FIG. 10 is a screen display that is provided following selection of the function "Generate Assessment Status Report" 802 of FIG. 8. This screen display provides status on individual users of the assessment tool, including a user's organization, manager, identification number, the dates any review or upload status was modified, and the date the Analysis Results for the user was last uploaded to Skills Database 114. This data is provided in Columns 1002, 1004, 1006, 1008, 1010, and 1012, respectively.

FIG. 11 is a screen display that is provided following selection of the function "User Activity Information" 804 of FIG. 8. This information provides status on the current usage of the assessment tool. This data includes the number of users who have signed onto the assessment tool within a predetermined amount of time, the maximum number of users that may use this tool concurrently, the highest occurrence of concurrent users since a predetermined date, and the number of users that were prohibited from signing onto the assessment tool because the maximum number of users had already signed onto the tool. This information is included in Rows 1100, 1102, 1104, and 1106, respectively. The status provided by this display may be used by system administrators to determine tool usage patterns, and to tune Data Processing System 100 and the current skill assessment tool to handle user loads.

FIG. 12 is a screen display that is provided following selection of the function "Create files for upload" 806 of FIG. 8. This screen is used to upload the Analysis Results 112 from Storage Device 104 to the Skills Database 114. Analysis Results may be uploaded for a specific user by entering a user identification number in Block 1200 and selecting the corresponding Selection Indicator 1201. Alternatively, Analysis Results may be uploaded for all employees who have marked "Upload Status Complete" and have not been uploaded within a selectable organization by specifying a manager name or organization number in Blocks 1202 or 1204, respectively, and selecting the associated Selection Indicator 1205. Using the expansion arrows such as that shown as Expansion Arrow 1206, Blocks 1202 and 1204 may be expanded into a window including a list of all possible managers and organizations, respectively. The user may employ either of these lists to specify the files for upload. The user chooses Selection Indicator 1207 if the Analysis Results for all employees are to be uploaded. The creation of the file that is to contain the uploaded Analysis Results is initiated by selection of the "Create File" function in Block 1208.

FIG. 13 is a screen display that is provided following selection of the function "Skill Set Reports" 808 of FIG. 8. This screen provides a submenu used to generate reports that include Analysis Results provided by any selectable group of people and pertaining to any selectable set of skills. Selection Indicators 1302 through 1308 provide the functions associated with selecting the group of people to be included in a report. The reports may be generated for everyone in the database by selecting Selection Indicator 1302. Alternatively, reports may be generated for all employees included in one or more selected organizations using Selection Indicator 1304. In a manner that is similar to that discussed above, the user may view a list of all organization designators by expanding the window shown as Block 1303 using the Expansion Arrow of Block 1303. One or more of the organization designators may be selected from this list. Reports may also be generated for all employees reporting directly to one or more managers using Selection Indicator 1306. The list of managers may be obtained by expanding the window shown as Block 1307. One or more managers may be selected from this list such that any employee reporting to any of the selected managers will be included in the report. Finally, one or more specific employees may be selected for inclusion in the report using Selection Indicator 1308 and the window shown as Block 1309. The list of possible employees may be obtained by expanding this window, and one or more employees may be selected for inclusion in the report, as shown in Block 1310. In the current example, the report will be generated using the three employees selected from the list in expanded Block 1310, including James Bixby, Max Gunther, and Judy Nagle.

In the preferred embodiment, multiple selections may be made using any of the mutually exclusive Selection Indicators 1302, 1304, 1306, and 1308. For example, a report may be generated such that all employees in organization 1234, and all employees reporting to Mr. Atwood and one or more additional managers are included in the report. Additionally, any number of organizations, and/or any number of employees could also be selected for use in creating the selected employee set.

Similarly, the set of skills to be used during report generation is selected using Selection Indicators 1312 and 1314. Selection Indicator 1312 is used to allow one or more MSSD Skill Sets of the type discussed above to define the set of skills to be used during report generation. The complete list of MSSD Skill Sets may be obtained by expanding the window shown as Block 1313, and one or more MSSD Skill Sets may be selected from this list such that each skill in any selected Skill Set is included for analysis within the generated report. A user may also select one or more Reporting Skill Sets for inclusion in the reports using Selection Indicator 1314. The list of Reporting Skill Sets is obtained by expanding the window shown as Block 1315. In the preferred embodiment, one or more MSSD Skill Sets or one or more Reporting Skill Sets may be selected for inclusion in report generation. All skills included in all selected Skill Sets are used in the report generation process. In the current example, a single MSSD Skill Set named "Business Excellence (LAM)" is selected for use during report generation as shown in Block 1313.

After selecting the employees and skills to be included in the reports, the user may select the type of report to be generated using Block 1316. In the preferred embodiment, the report may be a detailed report that includes Analysis Results for the selected employees and selected skills. This detailed report includes analysis data reported on an employee-by-employee, and a skill-by-skill, basis. Alternatively, a summary report may be generated that includes data for all employees in a summary format that provides general metrics, but does not include statistics on individual employees. These formats will be discussed further below. Finally, the user may select whether a report is to be written to a file, or is to be displayed on the screen. This selection is made using the window shown in Block 1318. When all selections have been made, report generation is initiated by selecting the "Generate Report" function in Block 1320. At any time during the selection process, the user may decide to discontinue selection and return to the previous screen using the "Back" function in Block 1322.

FIG. 14 is a display of a report generated using the summary format shown in Block 1316 of FIG. 13. This report includes data for the ten employees reporting to two selected managers, John Atwood and Ima Bore. An MSSD Skill Set is selected for the Business Excellence Department that includes two skills. The two skills included in the selected skill set includes "ISO Environmental Standards" and "Process Benchmarking" shown in Rows 1400 and 1402, respectively. Each of the ten employees have rated their proficiency associated with these two skills on a scale of 0 to 5, with 0 indicating no knowledge (or no data entered) for the skill, and 5 indicating an expert knowledge of the subject, as shown in FIG. 5. This data provides a tool to be used in matching a given group of people to a task. For example, the data can also be used by one or more managers to make hiring decisions, or to perform training and educational planning. The tool is dynamic such that the skills and employees included in a given report may be readily changed and new report data generated in an interactive manner. No reconfiguration of the tool or tool software needs to be performed to accomplish this modification. As a result, the tool may be used during a management planning session to make educated staffing and scheduling decisions.

FIG. 15 is a display of a report generated using the detailed format selected by the format selection function shown in Block 1316 of FIG. 13. This report includes data for three employees selected using the employee selection function provided by Selection Indicator 1308 and Window 1310. This report is similar to that shown in FIG. 14. However, using the detailed format, the data is displayed so that the skill rating for each selected employee is listed on an employee-by-employee basis. This detailed format may be useful when assigning specific tasks during a project planning meeting. It may also be useful when planning for employee performance reviews.

Figure 16:
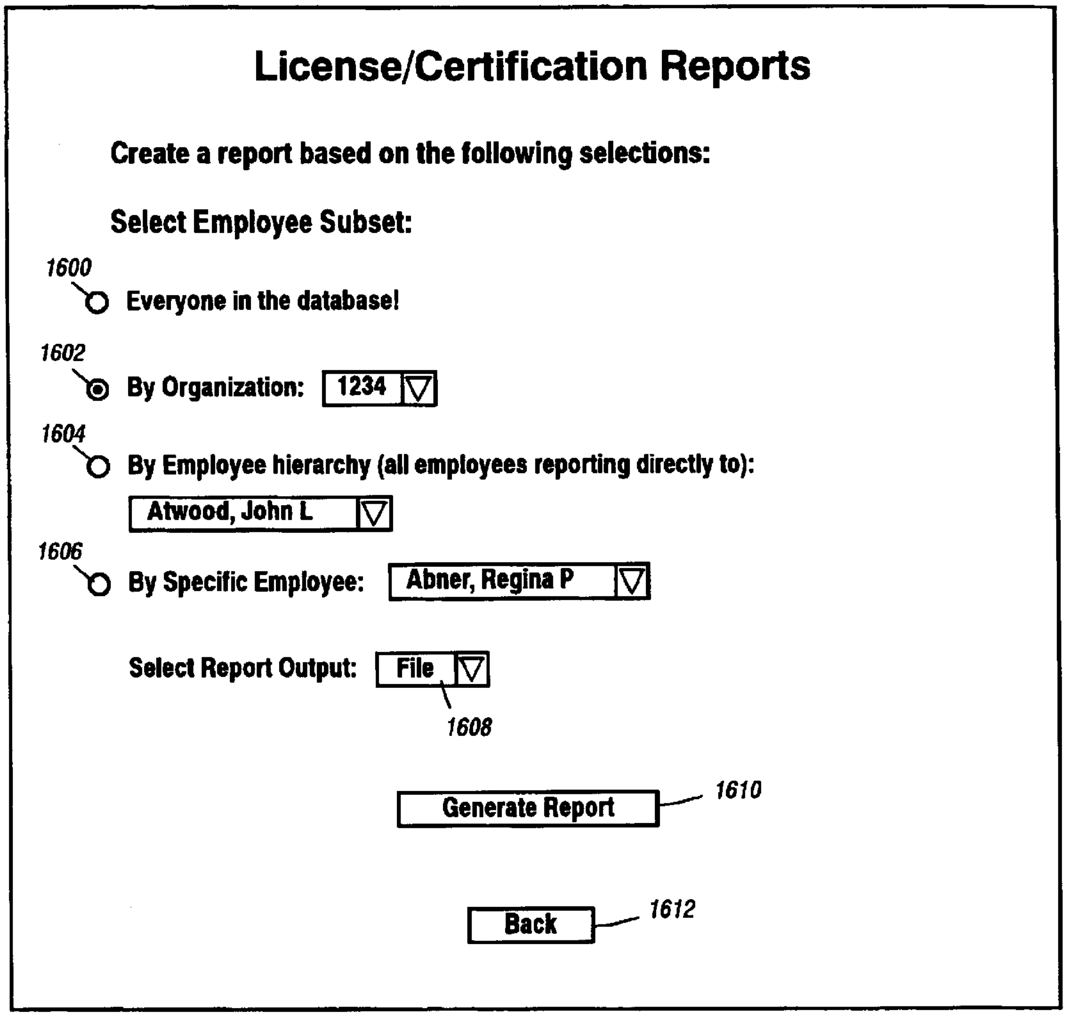
FIG. 16 is a screen display provided upon selection of the Licensing/Certification Reports function.

FIG. 16 is a screen display provided upon selection of the Licensing/Certification Reports function 812 of FIG. 8. This menu allows employees to be selected for use in generating reports including Licensing and Certification data. One or more selected employees are chosen using the Selection Designators shown as 1600, 1602, 1604, and 1606. The operation of these Selection Designators, in conjunction with any of the associated expandable windows, is as described above in reference to FIG. 13, and the detailed explanation will therefore not be repeated. As discussed above in reference to FIG. 13, the report data may be written to a file on Data Processing System 100, or may be provided to a screen display of User Interface 101, as is selected by the window of Block 1608. The report generation process is initiated using the Generate Report function of Block 1610. The "Back" function 1612 is used to return to the previously displayed menu in the manner discussed above.

FIG. 17 is a display of a Licensing/Certification Report generated using the menu selection options of FIG. 16. In the exemplary report, data is reported for the six employees in organization "1234". In this report, only one of the six employees is associated with any valid licensing or certification data. The certification name is shown, along with any certification identification information, and other relevant information pertaining to this certification. This information may be used to determine "at-a-glance" which employees need to undergo training, or need to be brought up-to-date in their licensing and/or certification requirements.

Another function provided by the Skills Administrative Function list shown in FIG. 8 is the Skill Set Management function 810. Selection of this function results in presentation of the menu shown in FIG. 4 which allows for the creation and deletion of named Skill Sets including any group of skills in the Comprehensive Skill Set. As discussed above, this capability to dynamically create new Skill Sets can be used in conjunction with the reporting capabilities to provide a tool that is flexible, and can be used to provide needed information in an efficient manner.

Figure 18A:
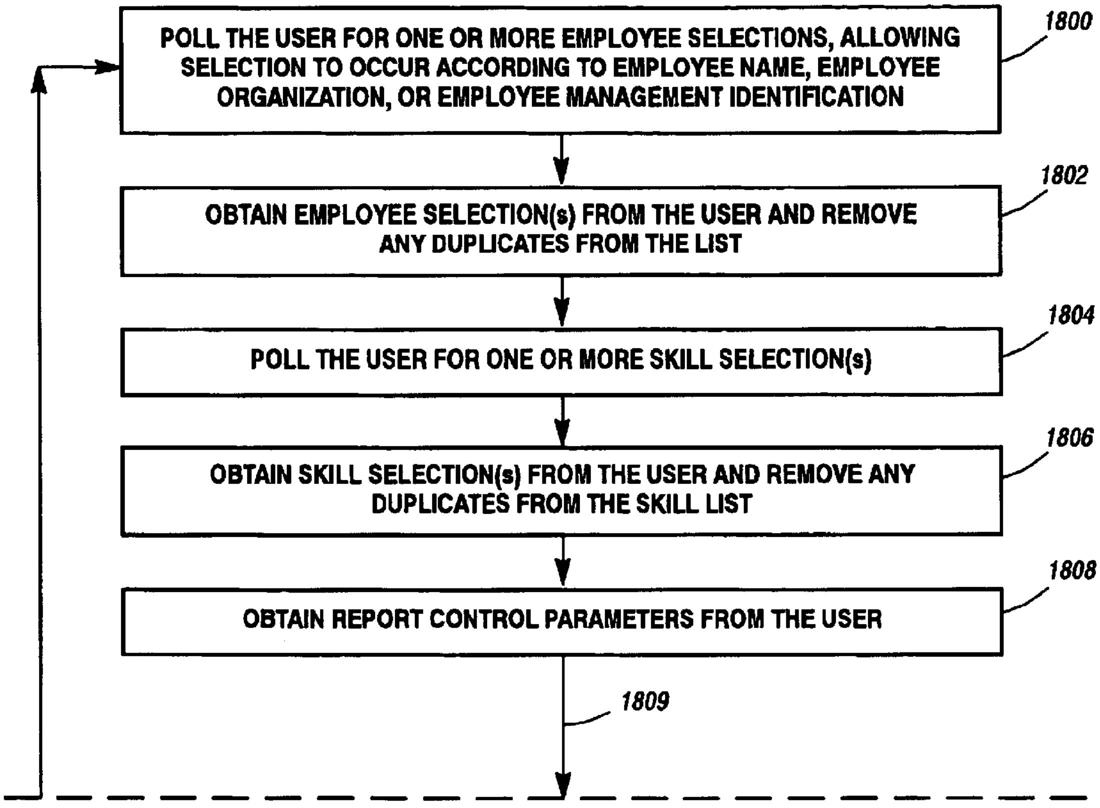
FIGS. 18A and 18B, when arranged as shown in FIG. 18, are a flowchart illustrating a process provided by Software Means to generate reports evaluating a selectable set of people against a selectable set of skills.
Figure 18:
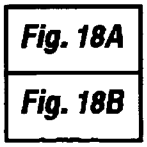
Figure 18B:
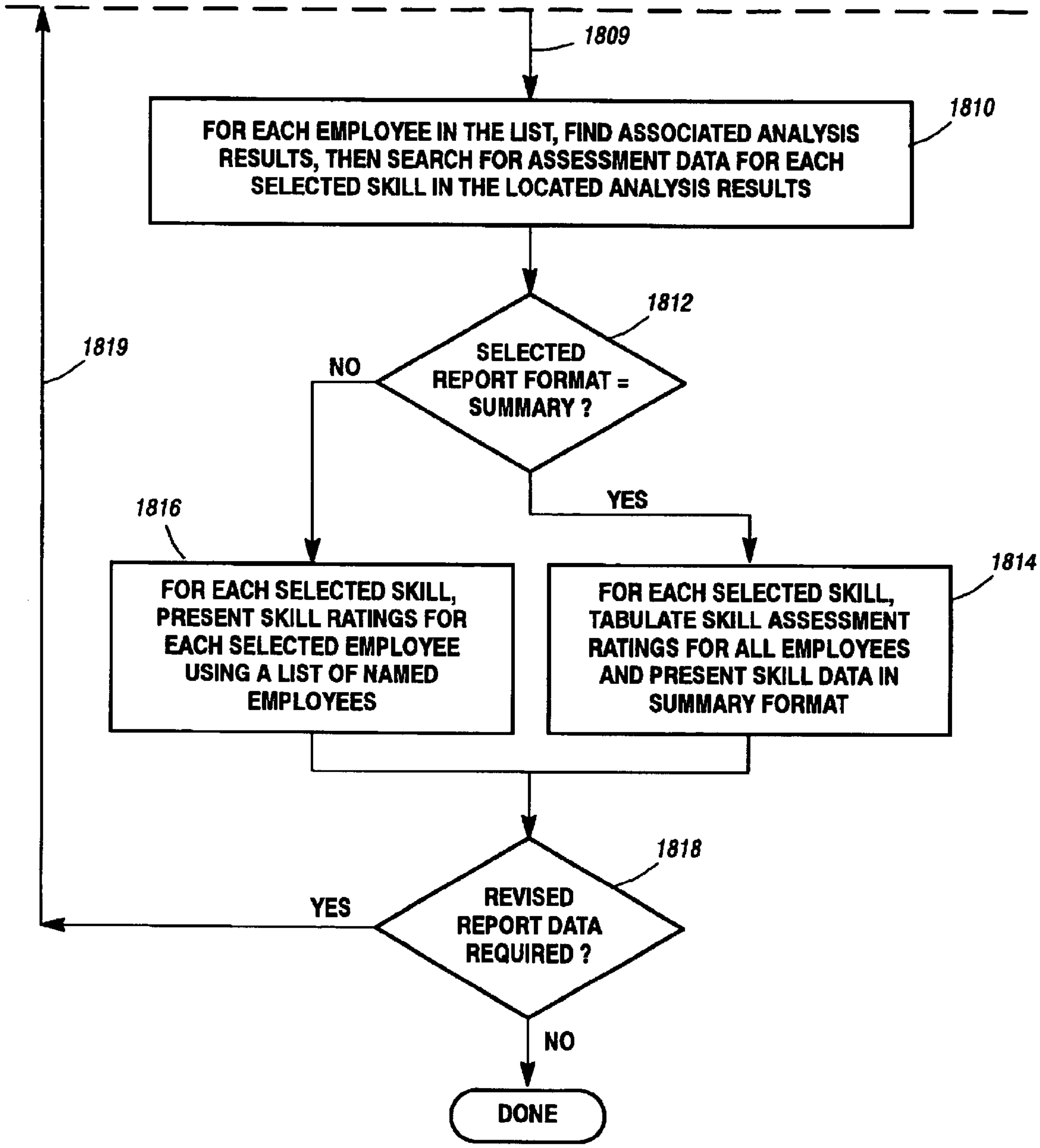

FIGS. 18A and 18B, when arranged as shown in FIG. 18, are a flowchart illustrating a process provided by Software Means 110 to generate reports evaluating a selectable set of people against a selectable set of skills. The menu associated with this process is described above in reference to FIG. 13. It will be appreciated that the ordering of the steps shown in FIG. 18 is, in many cases, arbitrary, and the steps could be performed in an alternative order. For example, the polling for, and the retrieval of report selection options, may be accomplished in any order as occurs when using a menu such as shown in FIG. 13. In Step 1800, a user is polled for the names of one or more employees. In the preferred embodiment, this data may be entered by selecting the organization identifier, the manager, or the name, of the employee(s). Other types of employee selection criteria could also be used such as the period of employment, for example, "all employees hired within a particular year", or the completion of a particular training requirement, such as "all employees having a completed engineering doctorate degree". Any combination of the above selection criteria may be used to select multiple employees. This data is retrieved from the user in Step 1802, and duplicate employee names are removed from the list. Next, the user is polled for a set of skills, as illustrated in Step 1804. In the preferred embodiment, this data may be entered using the names of individual skills, by specifying one or more MSSD and/or Reporting Skill Sets, or by specifying any combination thereof The skill data is retrieved from the user in 1806 and duplicate skills are removed from the list. The removal of duplicate skills is necessary if a particular skill is included in multiple selected skill sets. Finally, report control selections are retrieved from the user, including whether summary or detailed data is required, and whether the report results are to be provided to a file or to a display screen. This is displayed in Step 1808.

Processing continues to FIG. 18B as shown by Arrow 1809. For each of the employees specified, the Analysis Results 112 are searched to determine if records exist for each of the specified skills. If records do not exist, as may occur if a given employee has not completed the assessment process or was not required to evaluate a particular skill because that skill was not in the employee's MSSD, the skill rating is reported as "Blank/None".

Otherwise, the rating entered by the employee during the assessment process is included in the report. This is shown in Step 1810. After all available data is located, the report is generated. The format of the report is determined by the user-selected format of either "summary" or "detailed" as indicated by Decision Step 1812. If summary format is selected, a tabulation is made that includes, for each selected skill, the total number of employees from the selected employee set having ratings of each skill level. This is shown in Step 1814. This data is provided in a tabular format as shown in FIG. 14. If a detailed format is selected, for each selected skill, the ratings for each named employee are shown for the skill in a tabular format as shown in FIG. 15. This is illustrated in Step 1816. The selection data may be revised at any time and the report regenerated in a dynamic, interactive manner, as indicated in Step 1818 and Arrow 1819. This allows the tool to be used interactively during management meetings or planning sessions to revise scheduling forecasts, or to modify staffing and training requirements until a correct match between scheduling and staffing needs is achieved.

The process of FIG. 18 may be revised for use in displaying certification data. This is accomplished by eliminating the steps necessary to select the skills. In the preferred embodiment, all required licensing and certification data for a given employee is displayed when generating a licensing/certification report, as shown by the menu of FIG. 16 and the report display of FIG. 17.

Having described an exemplary embodiment of the invention in the drawings and accompanying description, those skilled in the art will recognize that various modifications to the exemplary embodiment could be made without departing from the scope and spirit of the claims set forth below:

What is claimed is:

1. For use with a data processing system used to perform skill assessment, the data processing system including a storage device for storing first data signals indicative of a Comprehensive Skill Set (CSS) that includes a comprehensive list of skills related to operation of an organization, the storage device further storing second data signals indicative of users of the data processing system, predetermined ones of the users each being associated with skill assessment data indicating the proficiency of the associated user at performing one or more of the skills included in the CSS, a skill assessment administration system, comprising:

first selection means for allowing any subset of the skills included in the CSS to be selected as a currently-selected skill set; and report generation means for creating a report including the skill assessment data associated with any of the users that indicates the proficiency of said any of the users at performing the skills included in said currently-selected skill set, the skills in said currently-selected skill set being related to tasks said any users may perform on behalf the organization.

2. The skill assessment administration system of claim 1, and further including second selection means for allowing any subset of the users of the data processing system to be selected as a currently-selected set of users, and wherein said report generation means includes means for generating said report including only the skill assessment data that indicates the proficiency of said any subset of the users of the data processing system at performing the skills included in said currently-selected skill set.

3. The skill assessment administration system of claim 2, wherein said second selection means includes name specification means for selecting said currently-selected set of users by specifying one or more of the names of the users of the data processing system.

4. The skill assessment administration system of claim 3, wherein each of the users of the data processing system are included within a respective group, and said second selection means includes group specification means for specifying one or more of said groups, and wherein each of the users included in any specified said one or more of said groups are included within said currently-selected set of users.

5. The skill assessment administration system of claim 4, wherein the storage device further includes means for storing third data signals to associate ones of the users each with a respective supervisory position, and wherein said second selection means includes hierarchy specification means for specifying one or more of said supervisory positions, and wherein each of the users associated with any specified said one or more of said supervisory positions is included in said currently-selected set of users.

6. The skill assessment administration system of claim 5, wherein the storage device includes means for storing fourth data signals to associated each of said supervisory positions with a respective one of the users, and wherein said hierarchy specification means includes means for allowing said supervisory position to be specified using the name of the respective one of the users.

7. The skill assessment administration system of claim 5, wherein said second selection means includes means for allowing said currently-selected set of users to be specified by selecting one or more specifications from the group consisting of one or more of the names of the users, one or more of said groups, and one or more of said supervisory positions.

8. The skill assessment administration system of claim 1, wherein the skills included in the CSS are organized into groups, and said first selection means includes group specification means for allowing said currently-selected skill set to be specified by selecting one or more of said groups, and whereby each of the skills included in any of said one or more selected groups are included in said currently-selected skill set.

9. The skill assessment administration system of claim 2, wherein said report generation means includes report type specification means for specifying that said report is to include summary metrics providing a summary of the skill assessment data associated with said currently-selected set of users.

10. The skill assessment administration system of claim 9, wherein said report type specification means includes means for specifying that said report shall be a detailed report including the proficiency of each of the users included in said currently-selected set of users at performing each of the skills included in said currently-selected skill set.

11. The skill assessment administration system of claim 2, wherein said first selection means and said second selection means are dynamically responsive to external input to allow for re-selection of said currently-selected skill set and said currently-selected set of users without requiring reconfiguration of the skill assessment administration system.

12. The skill assessment administration system of claim 2, wherein the storage device includes data signals indicative of licensing and certification data associated with ones of the users of the data processing system, and wherein said report generation means includes means for generating reports including said licensing and certification data for said currently-selected set of users.

13. The skill assessment administration system of claim 1, and further including administration metrics reporting means for summarizing which of the predetermined ones of the users have been associated with skill assessment data.

14. For use with a data processing system having a storage device to store first data signals indicative of a predetermined set of skills related to operation of an organization, to store second data signals indicative of a predetermined set of people included within the organization, and further to store third data signals indicative of the proficiency of ones of the predetermined set of people at performing ones of the predetermined set of skills, the data processing system further including an instruction processor coupled to the storage device to process ones of the first, second, and third data signals, the computer-implemented method of administering the first, second, and third data signals, comprising the steps of:

defining a currently-selected skill set to include any subset of the predetermined set of skills; and using the currently-selected skill set to create a report indicating the proficiency of the predetermined set of people at performing said currently-selected skill set for the purpose of assessing ability of the predetermined set of people to perform tasks for the organization.

15. The method of claim 14, and further including the step of:

defining a currently-selected group of people; and wherein said generating step generates a report indicating the proficiency of said currently-selected group of people at performing said currently-selected skill set.

16. The method of claim 15, wherein said step of defining said currently-selected group of people includes the steps of:

providing a menu including the names of the predetermined set of people; and allowing a user of the data processing system to provide selection indicators indicating the names of one or more of the predetermined set of people that are to be included in said currently-selected group of people.

17. The method of claim 16, wherein the storage device stores fourth data signals indicative of organizations, wherein ones of the people in the predetermined set of people are associated with a respective one of the organizations, and wherein said step of defining said currently-selected group of people further includes the steps of:

providing a menu including the names of the organizations; and allowing a user of the data processing system to provide selection indicators indicating the names of one or more of the organizations, and wherein each of the people associated with an indicated organization is included in said currently-selected group of people.

18. The method of claim 17, wherein the storage device stores fifth data signals indicative of supervisory personnel, wherein ones of the people in the predetermined set of people are associated with a respective one of the supervisory personnel, and wherein said step of defining said currently-selected group of people further includes the steps of.

providing a menu including the names of the supervisory personnel; and allowing a user of the data processing system to provide selection indicators indicating the names of one or more of the supervisory personnel, and wherein each of the people associated with an indicated one of the supervisory personnel is included in said currently-selected group of people.

19. The method of claim 18, wherein said step of defining said currently-selected group of people further includes the steps of:

allowing a user of the data processing system to provide any combination of said selection indicators selected from the group consisting of the names of one or more of the predetermined set of people, the names of one or more of the organizations, and the names of one or more of the supervisory personnel, and wherein each of the people associated with any of said selection indicators is included in said currently-selected group of people.

20. The method of claim 14, and further including the step of allowing a user to provide summary report-type input selection data, and in response thereto, performing said generating step to generate a summary report collectively indicating summary metrics on the proficiency of currently-selected set of people at performing said currently-selected skill set.

21. The method of claim 14, and further including the step of allowing a user to provide detailed report-type input selection data, and in response thereto, performing said generating step to generate a detailed report indicating the proficiency of each of said currently-selected set of people at performing each of the skills included in said currently-selected skill set.

22. The method of claim 15, wherein said storage device stores sixth signals indicative of the licensing and certification status of ones of the predetermined set of people, and further including the step of generating a report indicating the licensing and certification status of said currently-selected group of people.

23. The method of claim 14, wherein the predetermined set of skills is arranged into multiple groups, and said step of defining said currently-selected skill set includes selecting one or more of said multiple groups such that each of the skills included in said selected one or more of said multiple groups are included in said currently-selected skill set.

24. The method of claim 15, and further including the step of generating a report including administration metrics to summarize which of the predetermined set of people are described by the third data signals.

25. The method of claim 15, wherein said steps of defining said currently-selected skill set and said currently-selected group of people are performed dynamically using external input data signals received from a user of the data processing system and without requiring reconfiguration of the data processing system.

26. The method of claim 25, and further including the step of allowing a user to repeat said steps of defining said currently-selected skill set, defining said currently-selected group of people, and generating said report any number of times, and during each repetition, allowing the user to provide revised ones of said external input data signals.

* * * * *

UNITED STATES PATENT AND TRADEMARK OFFICE

CERTIFICATE OF CORRECTION

PATENT NO. : 6,735,570 B1
DATED : May 11, 2004
INVENTOR(S) : David R. Lacy, Ted G. Lautzenheiser and Mary A. Bucher It is certified that error appears in the above-identified patent and that said Letters Patent is hereby corrected as shown below:

Column 14,
Line 48, the term “any” should be omitted.

Column 15,
Line 67, the term “set” should read -- comprehensive set --.

Column 16,
Lines 5 and 12, the term “set” should read -- comprehensive set --.

Column 18,
Line 3, the term “predetermined” should read -- comprehensive predetermined --.

Signed and Sealed this

Eighth Day of February, 2005

JON W. DUDAS
*Director of the United States Patent and Trademark Office*